US009521526B2

(12) United States Patent
Gellens et al.

(10) Patent No.: US 9,521,526 B2
(45) Date of Patent: Dec. 13, 2016

(54) CONTROLLING THE TRANSFER OF TELEMATICS DATA USING SESSION RELATED SIGNALING

(71) Applicant: Qualcomm Incorporated, San Diego, CA (US)

(72) Inventors: Randall Coleman Gellens, San Diego, CA (US); Nikolai Konrad Leung, Takoma Park, CA (US); Stephen William Edge, San Diego, CA (US); David Hugh Williams, Malaga (ES)

(73) Assignee: QUALCOMM Incorporated, San Diego, CA (US)

( * ) Notice: Subject to any disclaimer, the term of this patent is extended or adjusted under 35 U.S.C. 154(b) by 208 days.

(21) Appl. No.: 13/779,255

(22) Filed: Feb. 27, 2013

(65) Prior Publication Data

US 2014/0094210 A1 Apr. 3, 2014

Related U.S. Application Data

(60) Provisional application No. 61/707,779, filed on Sep. 28, 2012.

(51) Int. Cl.
*H04W 4/12* (2009.01)
*H04W 4/22* (2009.01)
*H04L 29/08* (2006.01)

(52) U.S. Cl.
CPC ............. *H04W 4/12* (2013.01); *H04L 67/14* (2013.01); *H04W 4/22* (2013.01)

(58) Field of Classification Search
CPC ................................. H04W 4/22; H04W 4/12
See application file for complete search history.

(56) References Cited

U.S. PATENT DOCUMENTS

| 5,742,666 A | 4/1998 | Alpert |
| 5,777,580 A | 7/1998 | Janky et al. |
| 6,014,555 A | 1/2000 | Tendler |
| 6,282,491 B1 | 8/2001 | Bochmann et al. |

(Continued)

FOREIGN PATENT DOCUMENTS

| CN | 1189960 | 8/1998 |
| DE | 102009058097 A1 | 6/2011 |

(Continued)

OTHER PUBLICATIONS

International Search Report and Written Opinion—PCT/US2013/062333—ISA/EPO—Feb. 3, 2014.

(Continued)

*Primary Examiner* — Bobbak Safaipour
(74) *Attorney, Agent, or Firm* — Holland & Hart LLP

(57) ABSTRACT

Methods, systems, and devices are described for communicating telematics data and metadata. A first device transmits a first signaling message to a second device over a communication session signaling protocol. The first signaling message includes at least a first set of session information related to a communication session between the first device and the second device and a first set of telematics data for the first device. The first device receives a second signaling message from the second device over the communication session signaling protocol. The second signaling message includes metadata based on a content of the first set of telematics data transmitted in the first signaling message.

68 Claims, 29 Drawing Sheets

(56) References Cited

U.S. PATENT DOCUMENTS

| | | | |
|---|---|---|---|
| 6,340,928 B1 | 1/2002 | McCurdy | |
| 6,442,485 B2 | 8/2002 | Evans | |
| 6,480,144 B1 | 11/2002 | Miller et al. | |
| 6,483,865 B1 | 11/2002 | Beierle | |
| 6,485,081 B1 | 11/2002 | Bingle et al. | |
| 6,493,629 B1 | 12/2002 | Van Bosch | |
| 6,502,034 B1 | 12/2002 | Miller | |
| 6,505,507 B1 | 1/2003 | Imao et al. | |
| 6,580,916 B1 | 6/2003 | Weisshaar et al. | |
| 6,696,956 B1 | 2/2004 | Uchida et al. | |
| 6,711,399 B1 | 3/2004 | Granier | |
| 6,766,233 B2 | 7/2004 | Odinak et al. | |
| 7,099,835 B2 | 8/2006 | Williams, III | |
| 7,289,786 B2 | 10/2007 | Krasner | |
| 7,400,876 B2 * | 7/2008 | Freilich | G08G 1/20 379/37 |
| 7,574,195 B2 | 8/2009 | Krasner et al. | |
| 7,844,055 B2 * | 11/2010 | Mukherjee | H04L 12/58 380/250 |
| 7,904,053 B2 | 3/2011 | Krasner et al. | |
| 7,904,219 B1 | 3/2011 | Lowrey et al. | |
| 8,417,211 B2 * | 4/2013 | Hong | H04M 11/04 379/45 |
| 8,594,616 B2 * | 11/2013 | Gusikhin | H04W 4/22 340/426.2 |
| 8,644,301 B2 * | 2/2014 | Tamhankar | H04W 4/22 370/328 |
| 8,665,716 B2 * | 3/2014 | Niemi | H04W 36/0022 370/230 |
| 8,818,325 B2 * | 8/2014 | Hatton | G08G 1/205 340/436 |
| 8,849,237 B2 * | 9/2014 | Bourdu | G08G 1/127 455/404.1 |
| 2002/0137489 A1 | 9/2002 | Dutta et al. | |
| 2004/0104814 A1 | 6/2004 | Christensen et al. | |
| 2007/0121641 A1 * | 5/2007 | Hovey | H04L 67/02 370/395.2 |
| 2008/0090546 A1 * | 4/2008 | Dickinson | H04M 3/5116 455/404.1 |
| 2010/0202368 A1 | 8/2010 | Hans | |
| 2015/0025917 A1 * | 1/2015 | Stempora | G06Q 40/08 705/4 |
| 2016/0029197 A1 * | 1/2016 | Gellens | G05D 1/0011 455/404.1 |

FOREIGN PATENT DOCUMENTS

| | | |
|---|---|---|
| JP | 01298856 | 12/1989 |
| JP | 11231929 A | 8/1999 |
| JP | H11245853 A | 9/1999 |
| JP | H11339183 A | 12/1999 |
| JP | 2001028644 | 1/2001 |
| JP | 2001503513 A | 3/2001 |
| JP | 2007521712 | 8/2007 |
| WO | 2004066665 | 8/2004 |

OTHER PUBLICATIONS

Rosenberg J., et al., "RFC 3261: Session Initiation Protocol", Network Working Group, Jun. 2002 (Jun. 2002), pp. 1-29, XP002463370.

* cited by examiner 505-a { INVITE sip:user2@server2.com SIP/2.0

510-a {
Via: SIP/2.0/UDP alpha.server1.com;branch=d8eX5lB924ckopxd Max-Forwards: 60
To: user2 <sip:user2@server2.com>
From: user1 <sip:user1@server1.com>;tag=7603758658
Call-ID: b73a2d11c54873@alpha.server1.com
CSeq: 832634 INVITE
Contact: <sip:user1@alpha.server1.com>
Content-Type: multipart/mixed boundary="-----NextPart-----"
Content-Length: 142

515-a {
-----NextPart-----
v=0
o=user1 28905433261 23 IN IP4 192.168.3.4
s=session
c=IN IP4 192.168.3.4
t=0 0
m=audio 49170 RTP/AVP 0
a=sendrecv 520-a {
-----NextPart-----
Status = 6 (airbag + crash)
Cargo = 3
MSID= IMEI 001234567890123
Latitude = 41.3857
Longitude=2.1699
Velocity = 78
Direction = 23
Checksum
-----NextPart-----

↙ 550-a

FIG. 5B 505-b { INVITE sips:psap@example.gov SIP/2.0

510-b {
Via: SIPS/2.0/TLS pc33.rosebud.example.com; branch=z9hG4bK74bf9
Request-URI: urn:service:sos.eCall.automatic
To: urn:service:sos.eCall.automatic            } 525
Accept-Contact: *;sip.service="urn:service:sos*"
From: Alice <sips:alice@rosebud.example.com>; tag=9fxced76sl
Call-ID: 3848276298220188511@rosebud.example.com
Call-Info: cid:1234567890@rosebud.example.com; purpose=emergencyCall.eCallData } 530
Geolocation: <cid:target123@rosebud.example.com>
Accept: application/sdp, application/pidf+xml,
  application/emergencyCall-eCallData+xml,
  application/emergencyCall-CallMetaData+xml
CSeq: 31862 INVITE
Contact: <sips:alice@rosebud.example.com>
Content-Type: multipart/mixed; boundary=boundary1
Content-Length: ...

515-b {
--boundary1
Content-Type: application/sdp
*...SDP*

--boundary1
Content-Type: application/pidf+xml
Content-ID: target123@rosebud.example.com
*...PIDF-LO*

520-b {
--boundary1—
Content-Type: application/emergencyCall-eCallData.msd+xml
Content-ID: 1234567890@rosebud.example.com       } 535
*...eCall MSD data object*

--boundary1--

↖ 550-b

FIG. 5C 905-a { SIP/2.0 200 OK 910-a {
Via: SIP/2.0/UDP site4.server2.com;branch=z9hG4bK3423677;received=192.0.2.3
Via: SIP/2.0/UDP site3.server1.com;branch=z9hG4bK77e2htyfr323.1;received=192.0.2.2
Via: SIP/2.0/UDP alpha.server1.com;branch= d8eX5lB924ckopxd;received=192.168.3.4
To: user2 <sip:user2@server2.com>;tag=a6c85cf
From: user1 <sip:user1@server1.com>;tag=7603758658
Call-ID: b73a2d11c54873@alpha.server1.com
CSeq: 832634 INVITE
Contact: <sip:user2@192.4.6.1>
Content-Type: multipart/mixed boundary="-----NextPart-----"
Content-Length: 131

915-a {
-----NextPart-----
v=0
o=user1 28905433261 23 IN IP4 192.168.3.4
s=session
c=IN IP4 192.4.6.1
t=0 0
m=audio 49170 RTP/AVP 0
a=sendrecv 920-a {
-----NextPart-----
TLM/1.0 ACK
Status = 17 (emergency services notified, voice confirmation pending)
-----NextPart-----

950-a

FIG. 9B 905-b { SIP/2.0 200 OK 910-b {
Via: SIP/2.0/UDP site4.server2.com;branch=z9hG4bK3423677;received=192.0.2.3
Via: SIP/2.0/UDP site3.server1.com;branch=z9hG4bK77e2htyfr323.1;received=192.0.2.2
Via: SIP/2.0/UDP alpha.server1.com;branch= d8eX5lB924ckopxd;received=192.168.3.4
To: user2 <sip:user2@server2.com>;tag=a6c85cf
From: user1 <sip:user1@server1.com>;tag=7603758658
Call-ID: b73a2d11c54873@alpha.server1.com
CSeq: 832634 INVITE
Contact: <sip:user2@192.4.6.1>
Content-Type: multipart/mixed boundary="-----=_NextPart_000_0002_01BFC036"
Content-Length: 131

915-b {
-----=_NextPart_000_0002_01BFC036
v=0
o=user1 28905433261 23 IN IP4 192.168.3.4
s=session
c=IN IP4 192.4.6.1
t=0 0
m=audio 49170 RTP/AVP 0
a=sendrecv 920-b {
-----=_NextPart_000_0002_01BFC036
TLM/1.0 ACK
Status = 17 (emergency services notified, voice confirmation pending)
Action = 21 (turn off ignition, turn off fuel pump, unlock doors, play recording 1)
-----=_NextPart_000_0002_01BFC036

↙ 950-b

FIG. 9C 905-c { SIP/2.0 200 OK 910-c {
    Via: SIPS/2.0/TLS pc33.rosebud.example.com;
       branch=z9hG4bK74bf9; received=192.0.2.3
    To: urn:service:sos.eCall.automatic; tag=a6c85cf
    From: Alice <sip:alice@rosebud.example.com>; tag=9fxced76sl
    Call-ID: 3848276298220188511@rosebud.example.com
    CSeq: 31862 INVITE
    925 {
       P-eCallMetaData: ack=yes;
          ref=<1234567890@rosebud.example.com> } 930
       local-cmd=msg.static; static-msg-id=11; } 935
       local-cmd=action.GetNoticed; } 940
       nw-cmd=send.eCallData.AltSet1 } 945
    Contact: <sips:psap@example.gov>
    Content-Type: application/sdp
    Content-Length: ...

950-c

FIG. 9D 905-d { SIP/2.0 200 OK 910-d {
Via: SIPS/2.0/TLS pc33.rosebud.example.com;
   branch=z9hG4bK74bf9; received=192.0.2.3
To: urn:service:sos.eCall.automatic; tag=a6c85cf
From: Alice <sip:alice@rosebud.example.com>;
tag=9fxced76sl
Call-ID: 3848276298220188511@rosebud.example.com
925-a {
CSeq: 31862 INVITE
P-eCallMetaData: ack=yes;            } 930
  ref=<1234567890@rosebud.example.com>   } 955
  local-cmd=msg.dynamic;              } 960
  dynamic-msg-ref=<cid:5432154321@example.gov>; } 940
  local-cmd=action.GetNoticed;        } 945
  nw-cmd=send.eCallData.AltSet1
Contact: <sips:psap@example.gov>
Content-Type: multipart/mixed; boundary=xyzxyz
Content-Length: ...

915-d {
--xyzxyz
Content-Type: application/sdp 920-d {
--xyzxyz
Content-Type: audio/3gpp
Content-ID: 5432154321@example.gov     } 965
...*dynamic media*

--xyzxyz

↖ 950-d

FIG. 9E 905-e { SIP/2.0 200 OK 910-e {
Via: SIPS/2.0/TLS pc33.rosebud.example.com;
   branch=z9hG4bK74bf9; received=192.0.2.3
To: urn:service:sos.eCall.automatic; tag=a6c85cf
From: Alice <sip:alice@rosebud.example.com> ;tag=9fxced76sl
Call-ID: 3848276298220188511@rosebud.example.com
Call-Info: cid:9876543210@example.gov; purpose=EmergencyCall-
telematicsMetaData
CSeq: 31862 INVITE
Contact: <sips:psap@example.gov>
Content-Type: multipart/mixed; boundary=xyzxyz
Content-Length: ...
} 970

915-e {
--xyzxyz
Content-Type: application/sdp
   ...SDP 920-e { 975 {
--xyzxyz
Content-Type: application/EmergencyCall-telematicsMetaData+xml
Content-ID: 9876543210@example.gov <?xml version="1.0" encoding="UTF-8"?>
<telematicsMetaData
    xmlns="urn:3gpp:params:xml:ns:eCall"
    xmlns:dm="urn:3gpp:params:xml:ns:eCall:metadata"
    <ack rec=yes ref="1234567890@rosebud.example.com"/>   } 930-a
    <local-cmd cmd=msg.static msg-id="11"/>               } 935-a
    <local-cmd cmd=msg.dynamic type="audio/3gpp">         } 955-a
        <media> dynamic media </media>                    } 965-a
    </local-cmd>
    <local-cmd cmd=action.GetNoticed/>                    } 940-a
    <network-cmd cmd=send id=eCallData.AltSet1/>          } 945-a
</telematicsMetaData>

--xyzxyz—

CONTROLLING THE TRANSFER OF TELEMATICS DATA USING SESSION RELATED SIGNALING

CROSS REFERENCES

The present Application for patent claims priority benefit to U.S. Provisional Patent Application No. 61/707,779, entitled "Acknowledging or Re-requesting Telematics Data Using Call Signaling" by Gellens et al., filed Sep. 28, 2012, and assigned to the assignee hereof.

BACKGROUND

The following relates generally to wireless communication, and more specifically to the wireless transmission and receipt of telematics data and metadata. In some systems, telematics data (e.g., sensor readings and other data) may be transmitted from an intelligent terminal to a central service for processing. For example, a terminal associated with a vehicle experiencing a collision may transmit location and airbag deployment data over a wireless communication system to a public safety answering point (PSAP) in connection with a request for emergency services. In some systems, the data may be transmitted to a third-party service center, which may then convey some or all of the data to a PSAP.

Terminals associated with vehicles offering automatic crash response and emergency calling functionality generally use the voice channel of a cellular network to establish a voice call between a vehicle occupant and a PSAP operator. Telematics data may then be transmitted from the terminal to a central service (e.g., a PSAP server or a third-party service center) by modulating the voice channel using in-band signaling, Baudot tones, or other modem techniques. Metadata associated with the telematics data, such as an acknowledgement that the telematics data was satisfactorily (e.g., successfully) received or a request for a retransmission of the telematics data, may also be communicated from the central service to the terminal by modulating the voice channel in the reverse direction. The transmission of telematics data and metadata over a voice channel in this way can be problematic in that voice communication may be blocked or experience interference during the transmission of telematics data and metadata. Moreover, the transmission of modulated digital data through voice channels may provide limited data throughput or be unreliable due to voice processing functions in the network (e.g., improperly tuned echo-cancellers and use of compression on network trunks). These limitations may be further exacerbated in systems such as Long Term Evolution (LTE) and High Speed Packet Access (HSPA) when a voice channel is provided through packet rather than circuit means. Thus, more efficient and reliable methods of transmitting telematics data and metadata between a terminal and a central service are needed.

SUMMARY

The described features generally relate to methods and/or apparatuses for communicating telematics data. Telematics data includes telematics data that is sent from a terminal to a central service and metadata that is sent from the central service to the terminal. Signaling messages used in a communication session signaling protocol may be modified to include the telematics data. For example, a first signaling message sent from the terminal may include a session information and telematics data. In one example, the session information may include a request to initiate a communication session between the terminal and the central service. In another example, the session information may include information relating to an already existing communication session between the terminal and the central service. A second signaling message may be sent from the central service to the terminal. The second message may include metadata that is based on the received telematics data. The metadata may include, for example, an acknowledgement of whether the telematics data was received at the central service, a request to retransmit the telematics data, a request to transmit different telematics data, a request to take some other action, auxiliary data describing actions taken by the central service, and/or other relevant telematics metadata. In some configurations, the second signaling message may also include session information that is related to the communication session.

In one embodiment, a method of communicating telematics data is described. A first signaling message is transmitted from a first device to a second device over a communication session signaling protocol. The first signaling message includes at least a first set of session information related to a communication session between the first device and the second device and a first set of telematics data for the first device. A second signaling message is received at the first device over the communication session signaling protocol. The second signaling message includes metadata based on the content of the first set of telematics data transmitted in the first signaling message.

In some embodiments, the first set of session information may include a request to initiate the communication session or information associated with the communication session. In some cases, the second signaling message may include a second set of session information related to the communication session.

In some embodiments, receiving the second signaling message over the communication session signaling protocol may include receiving an indication of whether the first set of telematics data was satisfactorily received at the second device. The indication may include the metadata based on the content of the first set of telematics data.

In some embodiments, receiving the second signaling message over the communication session signaling protocol may further include receiving a request with respect to the first set of telematics data. The request may include the metadata based on the content of the first set of telematics data. In one example, the request may include a request to retransmit the first set of telematics data, a request to transmit an updated version of the first set of telematics data, or a request to transmit a different set of telematics data.

In some embodiments, a third signaling message may be transmitted from the first device to the second device over the communication session signaling protocol. The third signaling message may include at least a response to the request received with respect to the first set of telematics data.

In some embodiments, receiving the second signaling message over the communication session signaling protocol may further include receiving an instruction from the second device to take at least one action based on the content of the first set of telematics data. The instruction may include the metadata based on the content of the first set of telematics data. The at least one action may include at least one of: gathering additional telematics data, performing an action that affects a state of a vehicle, activating a component of a vehicle, deactivating a component of a vehicle, turning an ignition of a vehicle off, turning an ignition of a vehicle on, turning a fuel supply of a vehicle off, turning a fuel supply of a vehicle on, unlocking a door, locking a door, activating a horn of a vehicle, activating an externally audible sound, activating lights of a vehicle, activating flashers of a vehicle, actuating a power window, playing a recorded message, rendering media, or displaying a text message.

In some embodiments, it may be determined from the header of the second signaling message that at least a portion of a body of the second signaling message includes the metadata. In one example, it may be determined from the header of the second signaling message that the body of the second signaling message includes a multipart format. In this example, a first portion of the body of the second signaling message may be identified based on information in the header. The first portion of the body of the second signaling message may include at least the second set of session information related to the communication session. In this example, a second portion of the body of the second signaling message may be identified based on the information in the header. The second portion of the body of the second signaling message may include at least the metadata based on the content of the first set of telematics data transmitted in the first signaling message.

In some embodiments, a header for the first signaling message may be generated based on the communication session signaling protocol. The header may include an indication that at least a portion of a body of the first signaling message includes the first set of telematics data. In some cases, the first set of session information may be formatted according to a first protocol and the first set of telematics data may be formatted according to a second protocol. In these cases, the formatted first set of session information and the formatted first set of telematics data may be combined to generate the body of the first signaling message.

In some embodiments, the first signaling message may include an invitation to initiate the communication session and the second signaling message may include a rejection of the invitation. In some cases, the communication session signaling protocol may be at least one of a Session Initiation Protocol (SIP), Extensible Messaging and Presence Protocol (XMPP), Google Talk, or Skype. In one example, the communication session may be a Voice over Internet Protocol (VoIP) call. The communication session may carries one or more of voice, character-at-a-time text, message-at-a-time text, video, or text messaging using at least one of streaming or non-streaming media.

A device for communicating telematics data is also described. The device includes a processor and memory in electronic communication with the processor. The memory embodies instructions. The instructions are executable by the processor to transmit a first signaling message from a first device to a second device over a communication session signaling protocol. The first signaling message includes at least a first set of session information related to a communication session between the first device and the second device and a first set of telematics data for the first device. The instructions are also executable by the processor to receive a second signaling message at the first device over the communication session signaling protocol. The second signaling message includes metadata based on a content of the first set of telematics data transmitted in the first signaling message.

An apparatus for communicating telematics data is also described. The apparatus includes means for transmitting a first signaling message from a first device to a second device over a communication session signaling protocol. The first signaling message includes at least a first set of session information related to a communication session between the first device and the second device and a first set of telematics data for the first device. The apparatus additionally includes means for receiving a second signaling message at the first device over the communication session signaling protocol. The second signaling message includes metadata based on a content of the first set of telematics data transmitted in the first signaling message.

A computer program product for communicating telematics data is additionally described. The computer program product includes a non-transitory computer-readable medium that stores instructions. The instructions are executable by a processor to transmit a first signaling message from a first device to a second device over a communication session signaling protocol. The first signaling message includes at least a first set of session information related to a communication session between the first device and the second device and a first set of telematics data for the first device. The instructions are further executable by the processor to receive a second signaling message at the first device over the communication session signaling protocol. The second signaling message includes metadata based on a content of the first set of telematics data transmitted in the first signaling message.

A method of communicating telematics data is also described. At least a portion of a first signaling message from a first device is received at a second device over a communication session signaling protocol. The first signaling message includes at least a first set of session information related to a communication session between the first device and the second device and a first set of telematics data for the first device. A second signaling message is transmitted to the first device over the communication session signaling protocol in response to the first signaling message. The second signaling message includes metadata based on a content of the first set of telematics data received in the first signaling message.

In some embodiments, the first set of session information may include a request to initiate the communication session or information associated with the communication session. In some cases, the second signaling message may include a second set of session information related to the communication session.

In some embodiments, transmitting the second signaling message over the communication session signaling protocol may include transmitting an indication of whether the first set of telematics data was satisfactorily received at the second device. The indication may include the metadata based on the content of the first set of telematics data.

In some embodiments, transmitting the second signaling message over the communication session signaling protocol may include transmitting a request with respect to the first set of telematics data. The request may include the metadata based on the content of the first set of telematics data. In one example, the request may include at least one of: a request to retransmit the first set of telematics data, a request to transmit an updated version of the first set of telematics data, or a request to transmit a different set of telematics data.

In some embodiments, a third signaling message may be received from the first device over the communication session signaling protocol. The third signaling message may include a response to the request transmitted with respect to the first set of telematics data.

In some embodiments, transmitting the second signaling message over the communication session signaling protocol may include identifying at least one action associated with the first set of telematics data. In some cases, transmitting the second signaling message over the communication session signaling protocol may include transmitting an instruction to the first device to take the at least one identified action based on the content of the first set of telematics data. The instruction may include the metadata based on the content of the first set of telematics data. The at least one identified action may include at least one of: gathering additional telematics data, performing an action that affects a state of a vehicle, activating a component of a vehicle, deactivating a component of a vehicle, turning an ignition of a vehicle off, turning an ignition of a vehicle on, turning a fuel supply of a vehicle off, turning a fuel supply of a vehicle on, unlocking a door, locking a door, activating a horn of a vehicle, activating an externally audible sound, activating lights of a vehicle, activating flashers of a vehicle, actuating a power window, playing a recorded message, rendering media, or displaying a text message.

In some embodiments, it may be determined from a header of the first signaling message that at least a portion of a body of the first signaling message includes the first set of telematics data. In one example, it may be determined from the header of the first signaling message that the body of the first signaling message includes a multipart format. In this example, a first portion of the body of the first signaling message may be identified based on information in the header. The first portion of the body of the first signaling message may include at least the first set of session information related to the communication session. In this example, a second portion of the body of the first signaling message may be identified based on the information in the header. The second portion of the body of the first signaling message may include at least the first set of telematics data.

In some embodiments, a header for the second signaling message may be generated based on the communication session signaling protocol. The header may include an indication that at least a portion of a body of the second signaling message comprises the metadata. In some cases, the second set of session information related to the communication session may be formatted according to a first protocol. In some cases, the metadata based on the content of the first set of telematics data may be formatted according to a second protocol. In one example, the formatted second set of session information and the formatted metadata based on the content of the first set of telematics data may be combined to generate the body of the second signaling message.

In some embodiments, the first signaling message may include an invitation to initiate the communication session and the second signaling message may include a rejection of the invitation. In some cases, the communication session signaling protocol may include at least one of: Session Initiation Protocol (SIP), Extensible Messaging and Presence Protocol (XMPP), Google Talk, or Skype. In one example, the communication session may be a Voice over Internet Protocol (VoIP) call. The communication session may carry one or more of voice, character-at-a-time text, message-at-a-time text, video, or text messaging using at least one of streaming or non-streaming media.

A device for communicating telematics data is additionally described. The device includes a processor and memory in electronic communication with the processor. The memory embodies instructions. The instructions are executable by the processor to receive at least a portion of a first signaling message from a first device at a second device over a communication session signaling protocol. The first signaling message includes at least a first set of session information related to a communication session between the first device and the second device and a first set of telematics data for the first device. The instructions are further executable by the processor to transmit a second signaling message to the first device over the communication session signaling protocol in response to the first signaling message. The second signaling message includes metadata based on a content of the first set of telematics data received in the first signaling message.

An apparatus for communicating telematics data is also described. The apparatus includes means for receiving at least a portion of a first signaling message from a first device at a second device over a communication session signaling protocol. The first signaling message includes at least a first set of session information related to a communication session between the first device and the second device and a first set of telematics data for the first device. The apparatus additionally includes means for transmitting a second signaling message to the first device over the communication session signaling protocol in response to the first signaling message. The second signaling message includes metadata based on a content of the first set of telematics data received in the first signaling message.

A computer program product for communicating telematics data is additionally described. The computer program product includes a non-transitory computer-readable medium that stores instructions. The instructions are executable by a processor to receive at least a portion of a first signaling message from a first device at a second device over a communication session signaling protocol. The first signaling message includes at least a first set of session information related to a communication session between the first device and the second device and a first set of telematics data for the first device. The instructions are further executable by the processor to transmit a second signaling message to the first device over the communication session signaling protocol in response to the first signaling message. The second signaling message includes metadata based on a content of the first set of telematics data received in the first signaling message.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 5B shows a diagram of an exemplary request message according to a communication session signaling protocol;

FIG. 5C shows a diagram of an exemplary request message according to a communication session signaling protocol;

FIG. 9B shows a diagram of an exemplary response message according to a communication session signaling protocol;

FIG. 9C shows a diagram of an exemplary response message according to a communication session signaling protocol;

FIG. 9D shows a diagram of an exemplary response message according to a communication session signaling protocol;

FIG. 9E shows a diagram of an exemplary response message according to a communication session signaling protocol;

FIG. 9F shows a diagram of an exemplary response message according to a communication session signaling protocol;

DETAILED DESCRIPTION

Figure 1A:
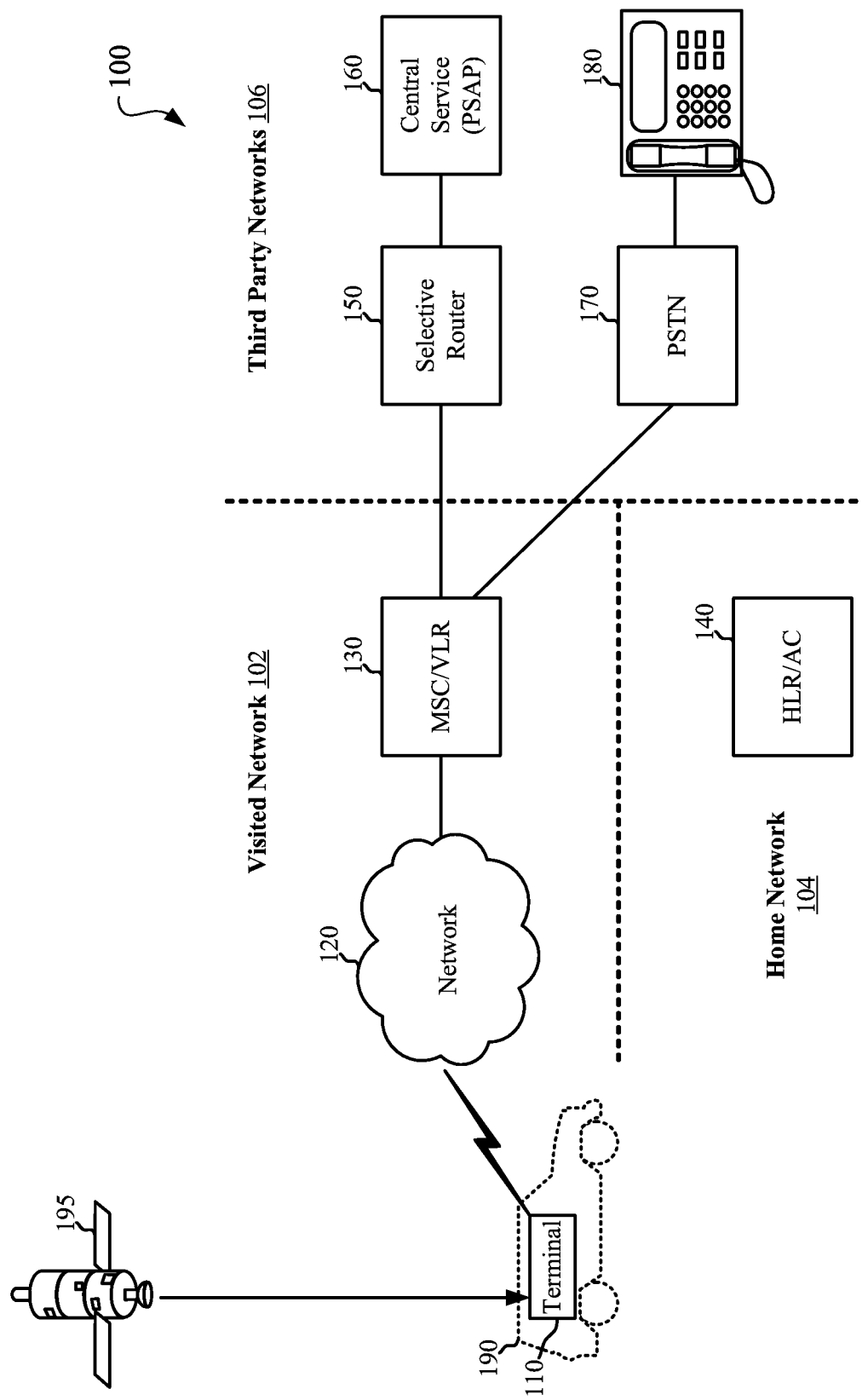
FIG. 1A shows a block diagram of a wireless communications system.

Management of telematics data and telematics metadata between a terminal and a central service is described. Where a terminal uses packet-based telephony (e.g., Voice over Internet Protocol (VoIP), all-IP, Next Generation Network (NGN), etc.) to establish communication with a central service, a communication session signaling protocol (e.g., Session Initiation Protocol (SIP)) may be used to carry telematics data and metadata separately from the voice channel. Thus, the terminal may transmit telematics data to the central service in a first signaling message over the communication session signaling protocol, the first signaling message including at least a set of session data and a set of telematics data. The terminal may receive a second signaling message from the central service over the communication session signaling protocol, the second signaling message including metadata associated with the set of telematics data transmitted in the first signaling message. The metadata may include, for example, an acknowledgement of whether the telematics data was received at the central service, a request to retransmit the telematics data, a request to transmit different telematics data, a request to take some other action, auxiliary data describing actions taken by the central service, and/or other relevant telematics metadata.

The following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

As used in the present description and claims, the term "telematics data" refers broadly to data generated, collected, or stored at a mobile device for transmission to a central service for processing. Telematics data may include, but is not limited to, vehicle diagnostics data (e.g., location data, airbag deployment data, collision or impact sensor data, engine sensor data, and the like). In some embodiments, the recipient of telematics data may be another device (e.g. a PC, laptop, mobile phone) rather than a central server or central service and the recipient may then store the telematics data, process it in some way or forward the data at the time of receipt or at a later time to another entity such as a central server. As an example of forwarding, a source of telematics data that is unable to establish a session with a central server may establish a session with some intermediate device that is able to reach the central server. The terms server, central server and central service as used herein are thus to be understood in these broad terms.

As used in the present description and claims, the term "telematics metadata" refers broadly to control or other data associated with telematics data transmitted between a mobile device and a central service. For example, telematics metadata may include, but is not limited to, an acknowledgement of whether the telematics data was received at the central service, a request to retransmit the telematics data, a request to transmit different telematics data, a request to take some other action, auxiliary data describing actions taken by the central service, and the like. While telematics metadata may often be transmitted from the central service to the mobile device in response to an attempt by the mobile device to transmit telematics data, telematics metadata may also be transmitted by the mobile device.

As used in the present description and claims, the term "communication session" or "session" refers broadly to a temporary or semi-permanent interactive information exchange between the endpoints or participants (e.g., a mobile device and a central server) for the purpose of streaming audio, video, or other media content between the endpoints or participants.

FIG. 1A shows an exemplary wireless network system 100 which may be used to exchange telematics data and related metadata between a terminal 110 and a central service (i.e., Public Safety Answering Point (PSAP) 160) through signaling messages transmitted over a communication session signaling protocol.

The wireless network system 100 may include a visited network 102, a home network 104, and third party networks 106. Visited network 102 may also be referred to as a Visited Public Land Mobile Network (V-PLMN), a serving network, etc. Home network 104 may also be referred to as a Home PLMN (H-PLMN). Visited network 102 may be a serving network for a terminal 110, which may be roaming from its home network 104, as assumed in much of the description below. Visited network 102 and home network 104 may be the same network if terminal 110 is not roaming.

Visited network 102 may include a radio access network (RAN) 120, a Mobile Switching Center (MSC)/Visitor Location Register (VLR) 130, and other network entities not shown in FIG. 1A for simplicity. RAN 120 may be a Global System for Mobile Communications (GSM) network, a Wideband Code Division Multiple Access (WCDMA) network, a General Packet Radio Service (GPRS) access network, a Long Term Evolution (LTE) network, CDMA 1× network, a High Rate Packet Data (HRPD) network, or an Ultra Mobile Broadband (UMB) network, etc. WCDMA and GPRS are part of Universal Mobile Telecommunication System (UMTS). GSM, WCDMA, GPRS, and LTE are described in documents from an organization named "3rd Generation Partnership Project" (3GPP). CDMA 1× and HRPD are part of cdma2000, and cdma2000 and UMB are described in documents from an organization named "3rd Generation Partnership Project 2" (3GPP2). MSC 130 may perform switching functions for circuit-switched calls and may also route Short Message Service (SMS) messages. VLR 130 may store registration information for terminals that have registered with visited network 102. For some types of RAN (e.g. an LTE, GPRS or HRPD RAN), MSC/VLR 130 may be replaced by other entities—e.g. by a Serving GPRS Support Node (SGSN) in the case of GPRS or a Mobility Management Entity (MME) in the case of LTE.

Home network 104 may include a Home Location Register (HLR)/Authentication Center (AC) 140 and other network entities not shown in FIG. 1A for simplicity. HLR 140 may store subscription information for terminals that have service subscription with home network 104. AC 140 may perform authentication for terminals having service subscription with home network 104. In some networks, HLR 140 may be replaced by a Home Subscriber Server (HSS). In some cases there may be no home network 104 if terminal 110 is not subscribed to normal communications services—e.g. is restricted to making emergency calls only.

Third party networks 106 may include a router 150 (e.g., a PSAP selective router), a central service 160 (e.g., PSAP), a Public Switched Telephone Network (PSTN) 170, and possibly other network entities not shown in FIG. 1A. Router 150 may route calls between MSC 130 and central service 160. Central service 160 may be responsible for answering emergency calls and may also be referred to as an Emergency Center (EC). Central service 160 may be operated or owned by a government agency, e.g., a county or city. PSTN 170 may provide telephone services for conventional wireline telephones, such as a telephone 180. In certain examples, third party networks 106 may also include at least one third-party central service (not shown) which may be configured to communicate with the central service 160 (e.g., PSAP). For example, a third-party central service may be a private service operated or affiliated with an automobile manufacturer. In certain examples, the third-party central service may receive some or all emergency calls from terminal 110 and forward data or calls to PSAP central service 160 when appropriate.

FIG. 1A shows only some of the network entities that may be present in visited network 102 and home network 104. For example, visited network 102 may include network entities supporting packet-switched calls and other services as well as a location server to assist in obtaining terminal location.

Terminal 110 may be stationary or mobile and may also be referred to as a mobile station (MS) in GSM and CDMA 1×, a user equipment (UE) in WCDMA and LTE, an access terminal (AT) in HRPD, a SUPL enabled terminal (SET) in Secure User Plane Location (SUPL), a subscriber unit, a station, etc. Terminal 110 may be a device such as a cellular phone or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals.

Terminal 110 may also include one or more devices which communicate with a personal navigation device (PND), such as by short-range wireless, infrared, wireline connection, or other connection—regardless of whether satellite signal reception, assistance data reception, and/or position-related processing occurs at the device or at the PND. Also, terminal 110 is intended to include all devices, including wireless communication devices, computers, laptops, etc. which are capable of communication with a server, such as via the Internet, WiFi, or other network, and regardless of whether satellite signal reception, assistance data reception, and/or position-related processing occurs at the device, at a server, or at another device associated with the network. Any operable combination of the above are also included. Terminal 110 may also be a dedicated In-Vehicle System (IVS), which may be permanently attached to (and possibly part of) a vehicle 190. Terminal 110 may be associated with one or more other devices not shown in FIG. 1A such as sensors attached to a vehicle or a control unit for sensors attached to a vehicle or some other source of telematics data that is able to send telematics data to terminal 110 (e.g. via wireless means) and possibly instigate a session from terminal 110 to a central server.

Terminal 110 may have a service subscription with home network 104 and may be roaming in visited network 102, as shown in FIG. 1A. Terminal 110 may receive signals from RAN 120 in visited network 102 or may communicate with the RAN to obtain communication services. Terminal 110 may also communicate with home network 104 for communication services when not roaming (not shown in FIG. 1A). In some embodiments, terminal 110 may monitor signals from RAN 120 but not communicate with RAN 120 until such time as a session may be needed with central service 160. Such embodiments may be advantageous to reduce signaling load on visited network 102 and avoid or minimize subscription chargers to the user of terminal 110. Terminal 110 may also receive signals from one or more satellites 195, which may be part of a satellite positioning system (SPS). An SPS may include a system of transmitters positioned to enable entities to determine their location on or above the Earth based, at least in part, on signals received from the transmitters. Such a transmitter may transmit a signal marked with a repeating pseudo-random noise (PN) code of a set number of chips and may be located on ground based control stations, user equipment and/or space vehicles.

In a particular example, such transmitters may be located on Earth orbiting satellite vehicles (SVs). For example, a SV in a constellation of Global Navigation Satellite System (GNSS) such as Global Positioning System (GPS), Galileo, Glonass or Compass may transmit a signal marked with a PN code that is distinguishable from PN codes transmitted by other SVs in the constellation (e.g., using different PN codes for each satellite as in GPS or using the same code on different frequencies as in Glonass). In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems.

By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS. Terminal 110 may measure signals from satellites 195 and obtain pseudo-range measurements for the satellites. Terminal 110 may also measure signals from base stations in RAN 120 and obtain timing and/or signal strength measurements for the base stations. The pseudo-range measurements, timing measurements, and/or signal strength measurements may be used to derive a position estimate for terminal 110. A position estimate may also be referred to as a location estimate, a position fix, etc.

Terminal 110 may have an International Mobile Equipment Identity (IMEI), which is a unique number assigned to the terminal. Terminal 110 may be used for a service subscription of a user. The service subscription may be associated with an International Mobile Subscriber Identity (IMSI), which is a unique number assigned to a subscription for GSM and UMTS networks. The service subscription may also be associated with a Mobile Subscriber Integrated Services Digital Network Number (MSISDN), which is a telephone number for the service subscription. The IMSI may be used as a key for the service subscription in a subscriber database in HLR 140. The MSISDN may be dialed by other users to connect calls to terminal 110 used for the service subscription. The IMSI, the MSISDN, and other subscription information may be stored in a Subscriber Identity Module (SIM) or a Universal Subscriber Identity Module (USIM), which may be inserted into terminal 110. Terminal 110 may also have no SIM/USIM, in which case terminal 110 may have only an IMEI but no IMSI or MSISDN.

Wireless networks may support different types of emergency calls. One type may include "normal" emergency calls originated by users dialing well-known emergency numbers such as 911 in North America and 112 in Europe. Another type may include eCalls, which are emergency calls that may have the characteristics described above and may include the transfer of telematics data to a central service as well as supporting voice and/or other media communication between the user of terminal 110 and the central service. Support for eCalls may be required by the European Union and by other world regions and/or countries. An eCall may be different from a normal emergency call in the manners in which the call is placed and the additional emergency related data that may be sent to establish the eCall and used to process the eCall. For example, the additional data may indicate how the eCall was initiated (e.g. whether manually by a user or automatically in response to sensor data or a sensor trigger), a vehicle type and vehicle identification number (VIN), a timestamp, a position estimate and position confidence flag, a direction of travel, a number of passengers (e.g., from seat occupancy sensors), other passenger data (e.g., fastened seatbelts), a service provider for terminal 110 (if any), a trigger type (e.g., deployed airbags, bumper sensors, fire indicators, rollover, or other situation detection, etc.), and possibly other information. The additional data may also enable an accurate geographic location of the terminal to be provided to the central service 160.

In certain examples, terminal 110 may be configured to initiate an emergency call to the central service 160 (e.g., PSAP). The emergency call may be initiated in response to manual input from a user or in response to one or more detected conditions (e.g., deployed airbags, collision sensors, fire indicators, rollover, or other situation detection, etc.). To initiate the emergency call, the terminal 110 may use a communication session signaling protocol such as Session Initiation Protocol (SIP), Extensible Messaging and Presence Protocol (XMPP), Google Talk, Skype, OSCAR, or Microsoft Messenger Service, or another communication session signaling protocol, to establish a packet-based call (e.g., voice call, packet based data call involving text, IM or video communication, and the like) with the central service 160 or a third-party central service (not shown). The terminal 110 may transmit a set of telematics data in a first signaling message over the communication session signaling protocol, and the central service 160 or third-party central service may respond via a second signaling message over the communication session signaling protocol with metadata for the set of telematics data, such as an acknowledgement of whether the telematics data was received at the central service, a request to retransmit the telematics data, a request to transmit different telematics data, a request to take some other action, auxiliary data describing actions taken by the central service, and/or other relevant telematics metadata. In this way, the transmission of telematics data and related telematics metadata may occur separately from voice and/or other media (e.g., Instant Message (IM), text, video, etc.) communications and need not therefore disrupt the media stream (e.g., media channel). Moreover, telematics data and related telematics metadata may be exchanged between the terminal 110 and central service much more efficiently and quickly than may be possible with voice channel modulation. Further, the telematics data and related telematics metadata may be associated or coordinated with the session and/or the voice channel (e.g., the telematics data and related telematics metadata may be exchanged between the same PSAP that is handling the voice channel).

Figure 1B:
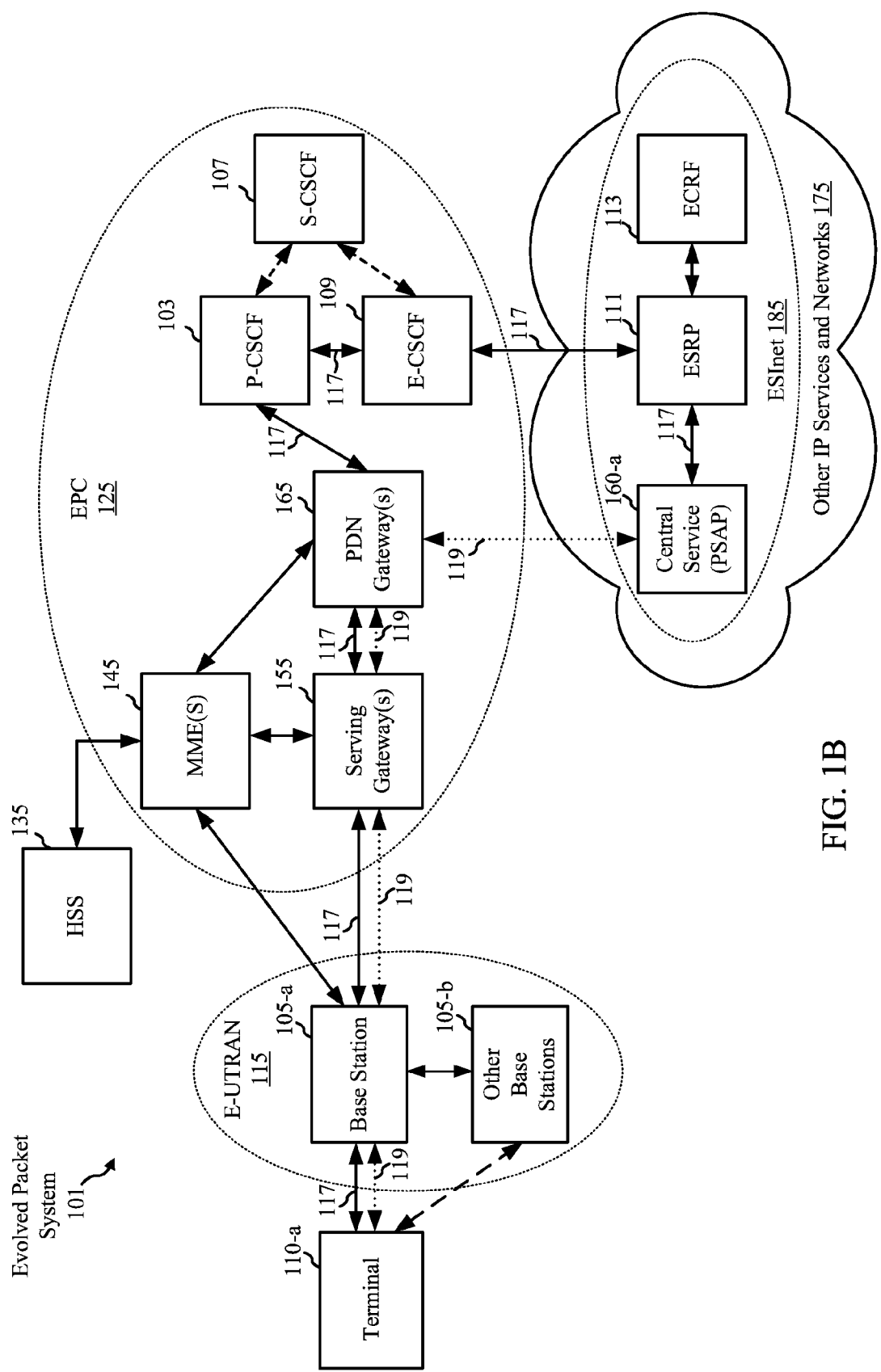
FIG. 1B illustrates another example block diagram of a wireless communications system.

FIG. 1B is a diagram illustrating an LTE/LTE-Advanced network architecture in accordance with various embodiments. The LTE/LTE-A network architecture may be referred to as an Evolved Packet System (EPS) 101. The EPS 101 may include one or more terminals 110-a (e.g., User Equipments (UEs)), an Evolved UMTS Terrestrial Radio Access Network (E-UTRAN) 115, an Evolved Packet Core (EPC) 125, a Home Subscriber Server (HSS) 135, and may connect to Other IP Services and Networks 175. The EPS 101 may interconnect with other access networks, but for simplicity those entities/interfaces are not shown. As shown, the EPS 101 provides packet-switched services, however, as those skilled in the art will readily appreciate, the various concepts presented throughout this disclosure may be extended to networks providing circuit-switched services.

The E-UTRAN 115 may include a base station 105-a (e.g., Evolved Node B (eNB)) and other base stations 105-b. The base station 105-a may provide user and control plane protocol terminations toward the terminal 110-a. The terminal 110-a may be an example of the terminal 110 of FIG. 1A. The base station 105-a may be connected to the other base stations 105-b via an X2 interface (e.g., backhaul). The base station 105-a may provide an access point to the EPC 125 for the terminal 110-a. The base station 105-a may be connected by an Si interface to the EPC 125. The EPC 125 may include one or more Mobility Management Entities (MMEs) 145, one or more Serving Gateways 155, and one or more Packet Data Network (PDN) Gateways 165. The MME 145 may be the control node that processes the signaling between the terminal 110-a and the EPC 125. Generally, the MME 145 may provide bearer and connection management and manage mobility for terminals such as terminal 110-a. All user IP packets may be transferred through the Serving Gateway 155, which itself may be connected to the PDN Gateway 165. The PDN Gateway 165 may provide terminal IP address allocation as well as other functions. The PDN Gateway 165 may be connected to the Other IP Services and Networks 175 including IP services owned and operated by the operator for EPS 101. The Other IP Services and Networks 175 may include the Internet, an Intranet, an IP Multimedia Subsystem (IMS), and a Packet-Switched (PS) Streaming Service (PSS). The Other IP Services and Networks 175 may also include (or connect to) an Emergency Services IP network (ESInet) 185, which may be owned or operated by or on behalf of some public (e.g., public safety) organization.

The PDN Gateway 165 may also be connected to a Proxy-Call Session Control Function (P-CSCF) 103. The P-CSCF 103 may be connected to an Emergency-Call Session Control Function (E-CSCF) 109. In certain examples (enterprise networks, for example), the P-CSCF 103 may be connected to the E-CSCF 109 through a Serving-Call Session Control Function (S-CSCF) 107. P-CSCF 103, E-CSCF 109, and S-CSCF 107 may be part of an IMS for EPS 101. In the case where the terminal 110-a is an IMS device, it may send an INVITE to its cellular carrier's network (e.g., to the P-CSCF 103 which may forward it to the E-CSCF 109, which may forward it to the emergency services network (ESInet) 185 which may determine the correct PSAP (e.g., central service 160-a) and forward it there).

The ESInet 185 may include a central service 160-a (e.g., PSAP), which may be an example of the central service 160 of FIG. 1A. The central service 160-a may be connected to an Emergency Services Routing Proxy (ESRP) 111. The ESRP 111 may be connected to an Emergency Call Routing Function (ECRF) 113.

The terminal 110-a may be configured to collaboratively communicate with multiple base stations 105 through, for example, Multiple Input Multiple Output (MIMO), Coordinated Multi-Point (CoMP), or other schemes. MIMO techniques use multiple antennas on the base stations and/or multiple antennas on the terminal to take advantage of multipath environments to transmit multiple data streams. CoMP includes techniques for dynamic coordination of transmission and reception by a number of base stations to improve overall transmission quality for terminal as well as increasing network and spectrum utilization.

In certain examples, terminal 110-a may be configured to initiate an emergency call to the central service 160-a (e.g., PSAP). The emergency call may be initiated in response to manual input from a user or in response to one or more detected condition (e.g., deployed airbags, collision sensors, fire indicators, rollover, or other situation detection, etc.). The emergency call may include a first set of signaling 117 related to a communication session signaling protocol (e.g., SIP) (that may include telematics information, for example) and a second set of signaling 119 related to a communication session (e.g., voice/data). The base station 105-a may route the first set of signaling 117 and the second set of signaling 119 to the serving gateway 155. The serving gateway 155 may route the first set of signaling 117 and the second set of signaling 119 to the PDN gateway 165. The PDN gateway 165 may route the first set of signaling 117 to the P-CSCF 103 and may route the second set of signaling 119 to the central service 160. The P-CSCF 103 may route the first set of signaling 117 to the E-CSCF 109. In some cases (in enterprise networks, for example), the P-CSCF 103 may route the first set of signaling 117 to the E-CSCF 109 via the S-CSCF 107. The E-CSCF 109 may route the first set of signaling 117 to the ESRP 111. The ESRP 111 may route the first set of signaling 117 to the central service 160-a. Thus, the telematics data and related telematics metadata may be associated or coordinated with the session and/or the media stream(s) (e.g., the telematics data and related telematics metadata may be exchanged between the same PSAP that is handling the media stream(s)). The media stream(s) may include any streaming media, including voice, message-at-a-time text (e.g., IM), character-at-a-time text (e.g., streaming text, real-time text), audio, video, and/or any non-streaming media such as text messages. In some cases, the media exchanged in what may be referred to as a media stream may carry only non-streaming media.

Figure 2:
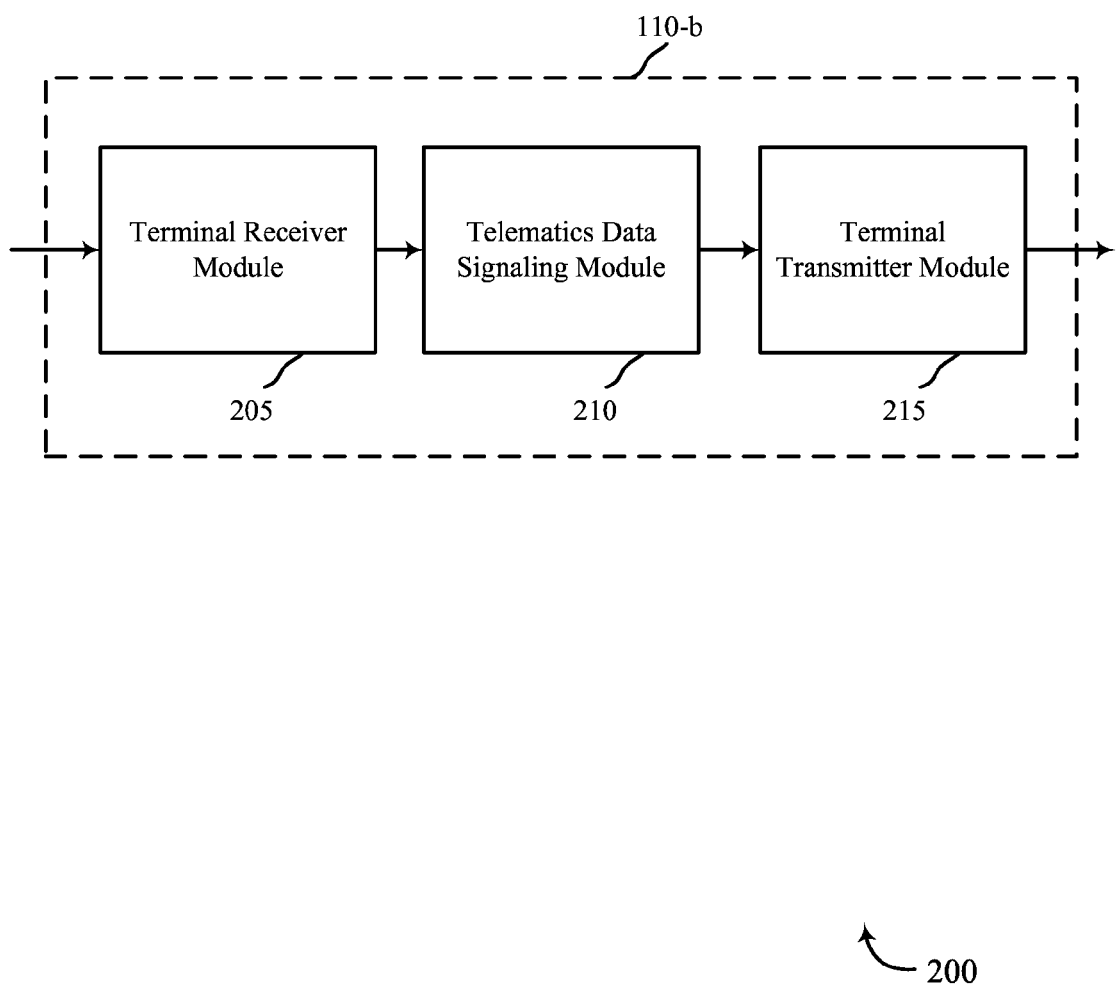
FIG. 2 is a block diagram illustrating one embodiment of a terminal in accordance with the present systems and methods.

FIG. 2 is a block diagram 200 illustrating one embodiment of a terminal 110-b, in accordance with the present systems and methods. The terminal 110-b may be an example of the terminal 110 of FIG. 1A and/or the terminal 110-a of FIG. 1B. The terminal 110-b may include a terminal receiver module 205, a telematics data signaling module 210, and a terminal transmitter module 215. Each of these components may be in communication with each other. Terminal 110-b may include other modules not shown in FIG. 2—e.g. may include sensors to detect conditions and events associated with a vehicle and a receiver and processor to enable the location of the terminal to be estimated or determined from wireless signals received from GPS satellites.

These components of the terminal 110-b may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In one configuration, the terminal receiver module 205 may include a cellular receiver and may receive transmissions from a base station 105. In one example, the terminal receiver module 205 may receive a signaling message for a communication signaling protocol that has been adapted to include telematics metadata. The telematics data signaling module 210 may extract the telematics metadata from the adapted signaling message. The telematics data signaling module 210 may also adapt a signaling message for a communication signaling protocol to include telematics data. The adapted signaling message for the communication signaling protocol may be transmitted via the terminal transmitter module 215. Details regarding the telematics data signaling module 210 will be described below.

Figure 3:
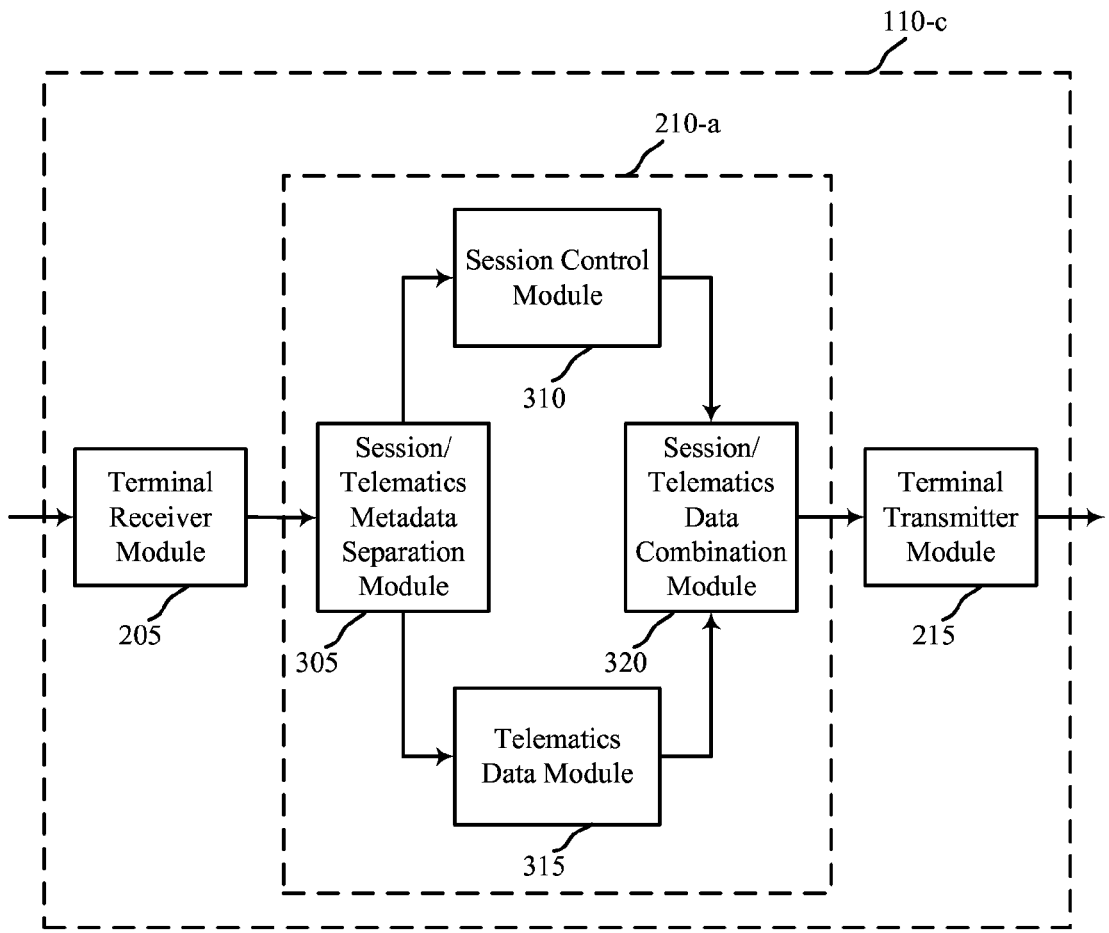
FIG. 3 is a block diagram illustrating a further embodiment of the terminal.

FIG. 3 is a block diagram 300 illustrating one embodiment to of a terminal 110-c in accordance with the present systems and methods. The terminal 110-c may be an example of the terminal 110 illustrated in FIGS. 1A, 1B, and/or 2. The terminal 110-c may include a terminal receiver module 205, a telematics data signaling module 210-a, and a terminal transmitter module 215, as previously described. Each of these components may be in communication with each other.

These components of the terminal 110-c may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In one embodiment, the telematics data signaling module 210-a may include a telematics data module 315. The telematics data module 315 may generate and/or obtain telematics data. The telematics data module 315 may also receive telematics metadata. In certain examples, the telematics data module 315 may obtain telematics data based on received telematics metadata.

The telematics data signaling module 210-a may also include a session control module 310. The session control module 310 may use one or more signaling messages to control and/or facilitate a communications session. In certain embodiments, the session control module 310 may control and/or facilitate a communications session by communicating session information according to a communication session signaling protocol. In one example, the session control module 310 may generate a signaling message that includes a set (e.g., first set) of signal information. The session control module 310 may also obtain a signaling message that includes a set (e.g., second set) of signal information.

In one embodiment, the telematics data signaling module 210-a may include a session/telematics metadata separation module 305. As noted previously, a signaling message may be adapted to include telematics data and/or telematics metadata along with the session information. For example, a signaling message may be adapted to include a second set of session information and a first set of telematics metadata. The session/telematics metadata separation module 305 may extract any telematics metadata from an adapted signaling message. The session/telematics metadata separation module 305 may provide the session information (in the form of a signaling message, for example) to the session control module 310 and may provide the telematics metadata to the telematics data module 315.

The telematics data signaling module 210-a may also include a session/telematics data combination module 320. The session/telematics data combination module 320 may adapt a signaling message generated by the session control module 310 to include telematics data from the telematics data module 315. In one example, the adapted signaling message may include a first set of session information and a first set of telematics data. The adapted signaling message may be transmitted via the terminal transmitter module 215.

Figure 4:
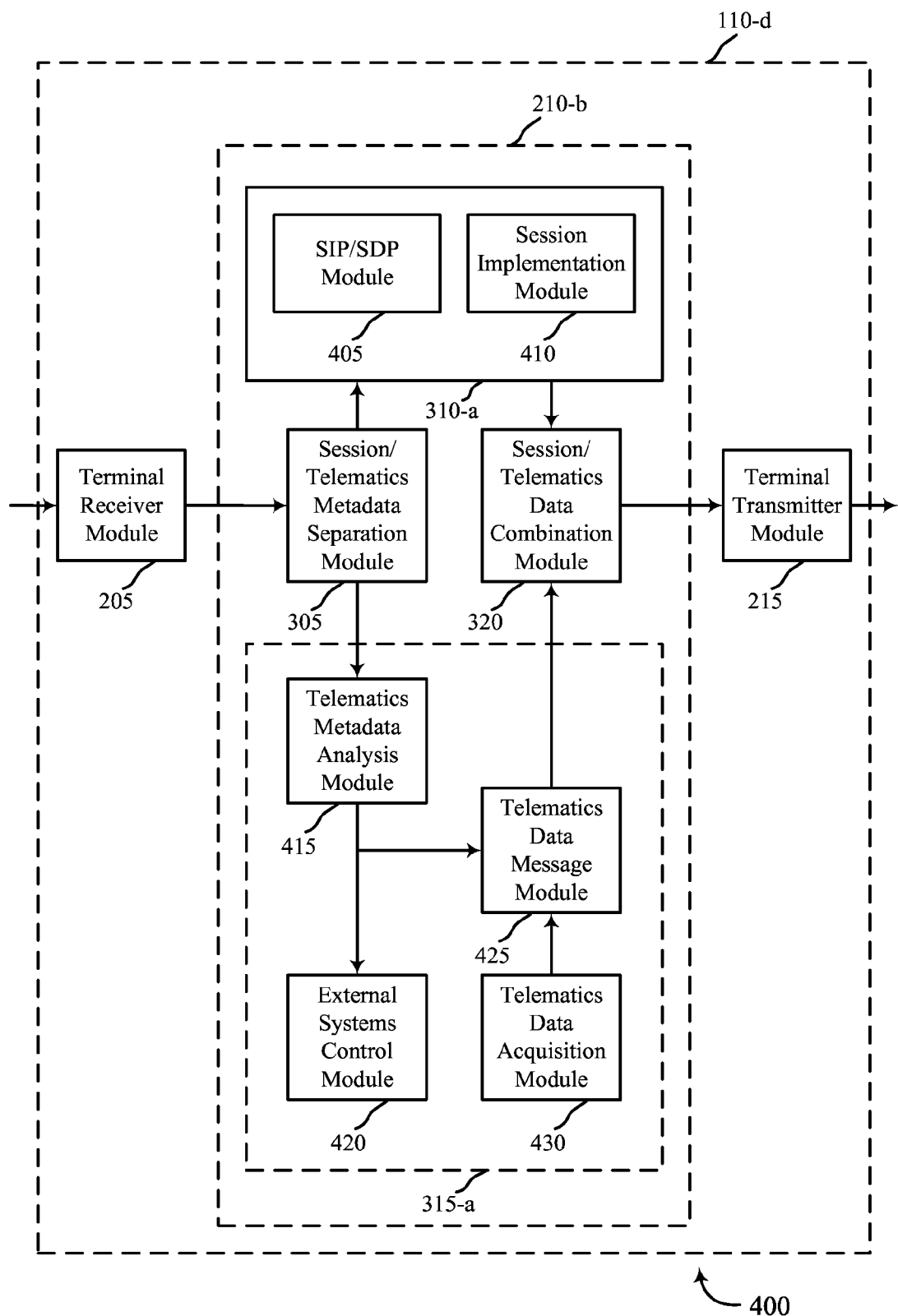
FIG. 4 is a block diagram illustrating a further example of the terminal for implementing the functionality of the present systems and methods.

FIG. 4 is a block diagram 400 illustrating one embodiment of a terminal 110-d in accordance with the present systems and methods. The terminal 110-d may be an example of the terminal 110 illustrated in FIGS. 1A, 1B, 2, and/or 3. In one configuration, the terminal 110-d may include a terminal receiver module 205, a telematics data signaling module 210-b, and a terminal transmitter module 215. Each of these components may be in communication with each other.

These components of the terminal 110-d may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In one example, the terminal 110-d may be configured at least to gather telematics data, establish a communication session with a central service, transmit telematics data to the central service through an adapted use of a communication session signaling protocol, receive telematics metadata from the central service via the adapted use of the communication session signaling protocol, and take certain actions based on the received telematics metadata.

The telematics data signaling module 210-b may include a session control module 310-a. The session control module 310-a may include an SIP/SDP module 405 and a session implementation module 410. The SIP/SDP module 405 may be configured to negotiate, set up, manage, and terminate communication sessions with the central service. The SIP/SDP module 405 may generate SIP signaling message header content and SDP content to communicate session-related signaling data with the central service. The session implementation module 410 may be configured to receive media content (e.g., audio data for a voice call, audio and video data for a video call, text data for a call with text with or without voice or video), transmit the media content as a stream of packets to the central service according to the negotiated session, and receive a stream of packets containing media content from the central service according to the negotiated session.

The telematics data signaling module 210-*b* may also include a telematics data module 315-*a*. The telematics data module 315-*a* may include a telematics data acquisition module 430, a telematics data message module 425, a telematics metadata analysis module 415, and an external systems control module 420. The telematics data acquisition module 430 may gather telematics data from a system or device associated with the terminal 110-*d*. For example, where terminal 110-*d* is associated with a vehicle, the telematics data acquisition module 430 may gather data related to a vehicle type and vehicle identification number (VIN), one or more timestamps, a position estimate and associated degree of confidence, a direction of travel, a number of passengers (e.g., with fastened seatbelts), a service provider for the terminal (if any), a trigger type (e.g., deployed airbags, bumper sensors, manual trigger, fire indicators, rollover, or other situation detection, etc.), and/or other relevant information that may suit a particular application of the principles described herein.

The telematics data message module 425 of the telematics data module 315-*a* may format telematics data for transmission to the central service according to a protocol understood by the central service. In certain examples, telematics data message module 425 may compile a standard set of telematics data for transmission to the central service. Additionally or alternatively, the telematics data message module 425 may be configured to compile a set of specific telematics data requested from the central service for transmission to the central service.

The telematics data module 315-*a* may additionally include a telematics metadata analysis module 415. The telematics metadata analysis module 415 may analyze the telematics metadata to identify any actions that may be performed based on the telematics metadata received from the central service in association with the telematics data transmitted to the central service. The identified actions may be specifically requested by the central service or inferred by the telematics metadata analysis module 415 based on the received telematics metadata. For example, the telematics metadata may include a request to retransmit the telematics data, to transmit a different set of telematics data, or to transmit an updated version of the set of telematics data. The telematics metadata analysis module 415 may provide the appropriate telematics metadata and/or appropriate instructions to the telematics data message module 425 and/or the external systems control module 420.

The external systems control module 420 of the telematics data module 315-*a* may be configured to take one or more actions based on telematics metadata received from the central service in association with the telematics data transmitted to the central service. Returning again to the example in which the terminal 110-*d* is associated with a vehicle and the telematics data is transmitted to the central service in response to a detected collision, the telematics metadata may include instructions to take certain precautionary or rescue actions with respect to the vehicle and its occupants. Such actions may include, but are not limited to, gathering additional telematics data, turning off or on an ignition of the vehicle, turning a fuel supply of the vehicle off or on, unlocking or locking a door of the vehicle, activating the horn of the vehicle, playing externally audible sounds, turning on the lights (e.g., headlights, running lights) of the vehicle, turning on the interior (e.g., cabin) lights of the vehicle, turning on the flashers of the vehicle (e.g., 4 ways, emergency flashers, hazard lights), actuating a power window, playing a recorded message received from the central service or stored at the terminal 110-*d*, rendering media (e.g., rendering text-to-speech, playing media sent by the central service, playing media referenced by and/or associated with an instruction sent by the central service), displaying a text message received from the central service or stored at the terminal 110-*d*, or other appropriate actions. It is noted that the things such as activating the horn, playing externally audible sounds, turning on the light, and/or turning on the flashers may help alert emergency personnel of the location of the vehicle or otherwise get noticed.

The telematics data signaling module 210-*b* may include the session/telematics metadata separation module 305. The session/telematics metadata separation module 305 may receive (via the terminal receiver module 205, for example) a modified SIP or other communication session signaling protocol message and may separate the SIP/SDP (or other protocol) information from telematics metadata messages. In certain embodiments, the session/telematics metadata separation module 305 may provide the SIP/SDP (or other protocol) information to the SIP/SDP module 405 and the one or more telematics metadata messages to the telematics metadata analysis module 415 as described above. In one example, the session/telematics metadata separation module 305 may identify different portions of a modified SIP message based on information from the header of the modified SIP message. In this example, the session/telematics metadata separation module 305 may provide the portions identified as SIP/SDP information to the SIP/SDP module 405 and the portions identified as telematics metadata messages to the telematics metadata analysis module 415 as described above.

The telematics data signaling module 210-*b* may also include the session/telematics data combination module 320. The session/telematics data combination module 320 may combine SIP/SDP (or other protocol) information from the SIP/SDP module 405 and one or more telematics data messages from the telematics data message module 425-*a* into a modified SIP or other communication session signaling protocol message as described above. The terminal transmitter module 215 may transmit the generated signaling messages to the central service.

Figure 5A:
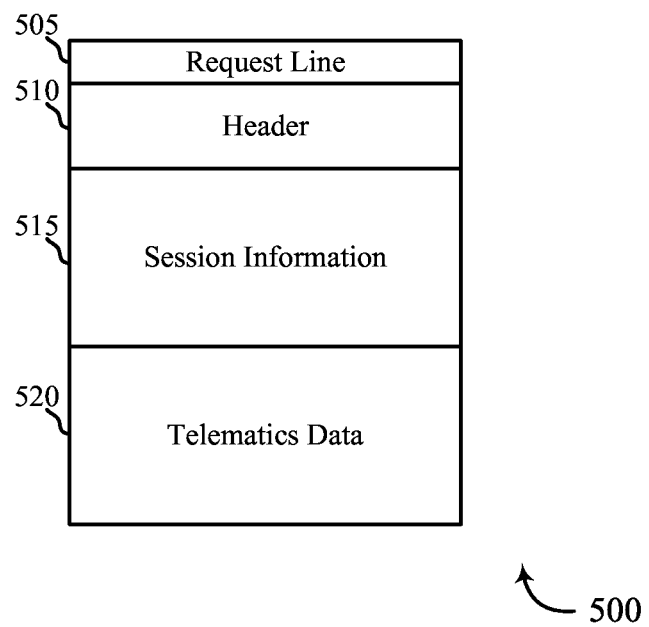
FIG. 5A shows a block diagram of an exemplary format for a request message according to a communication session signaling protocol.

FIG. 5A, FIG. 5B, and FIG. 5C illustrate an example of a session initiation protocol (SIP) request message modified to carry both session data and telematics data. FIG. 5A shows a diagram of an example format 500 of the request message and FIGS. 5B and 5C show a diagram of the content of an example SIP request message 550 based on the format of FIG. 5A. While the examples of FIG. 5A, FIG. 5B, and FIG. 5C are described in the context of modified and repurposed SIP request messages, it will be understood that the principles of the present description may be used to modify or extend other communication session signaling protocols (e.g., XMPP, Google Talk, MSN, etc.) or as a basis for new communication session signaling protocols.

By repurposing the SIP protocol to carry both session data and telematics data, the telematics data may be efficiently transmitted to a central service without interrupting or degrading the quality of a related call. As shown in FIG. 5A, the modified SIP request message format 500 may include a request line 505, a header 510, a set of session information 515 (e.g., session parameters, session data), and a set of telematics data 520. The SIP protocol is defined by the Internet Engineering Task Force (IETF) in a number of Request For Comments standards such as RFC 3261. These standards define a number of SIP request and response messages, including an INVITE message, an ACK message, a BYE message, a CANCEL message, an OPTIONS message, a REGISTER message, a PRACK message, a SUBSCRIBE message, a NOTIFY message, a PUBLISH message, an INFO message, a REFER message, a MESSAGE message, and an UPDATE message. The present format 500 may be used for each of these messages and for other types of request and response messages.

In the example of FIG. 5B, a modified SIP INVITE message 550-*a* based on the format of FIG. 5A may be used, for example, by a terminal to simultaneously request a call or other communications session with a central service and transmit telematics data to that central service. In this way, the telematics data may be received by the central service even if the central service is unable to establish (or declines) a call with the terminal.

The request line 505-*a* of the example SIP INVITE message 550-*a* may identify the message 550-*a* as a request and specify the type of request that is being made (e.g., INVITE). The header 510-*a* of the request message may define the source of the request, the intended recipient (e.g., emergency service URN) of the request, a call identifier, contact information for the source, a call sequence number, an indication of the type of data in the body, and a length of the message. In the present example, the header 510-*a* may specify that the body contains mixed data, with the character string "-----NextPart-----" indicating the boundary between the different types of data in the body. In the present example, the body of the message includes both session information 515-*a* and telematics data 520-*a*. It is noted that the present example may not show all of the header fields that may typically be included.

The session information 515-*a* may include of list of parameters for the proposed session between the terminal and the central service. For example, the SIP INVITE message 550-*a* of may include a set of Session Description Protocol (SDP) parameters for setting up a VoIP audio call.

The telematics data 520-*a* may include sensor readings, stored or logged data, and other data associated with the terminal that are transmitted to the central service. In certain examples, the telematics data may not be directly related to setting up and maintaining the session. Thus, even if the central service rejects the proposed parameters of the call in the session information 515-*a* portion of the SIP INVITE message 550-*a* or is unable to establish the session for other reasons, the central service may still receive and process the telematics data 520-*a*. In the present example, the SIP INVITE message 550-*a* may propose an emergency call with a PSAP service based on an automatic or manual trigger in a vehicle. The telematics data 520-*a* transmitted with the parameters session information 515-*a* may include a number of measurements related to the status of the vehicle and/or its occupants and the events triggering the emergency call. As shown in the example of FIG. 5B, the telematics data 520-*a* may include a status code, a cargo type, a manufacturer specific identifier associated with the terminal, the location of the vehicle, a current or previous velocity of the vehicle, a direction of the vehicle, and a checksum. In certain examples, the telematics data 520-*a* may include an eCall minimum set of data (MSD) or other standard set of emergency call data—e.g., as defined by or on behalf of some country or region (e.g. the European Union).

FIG. 5C shows an example modified SIP request message 550-*b* similar to the modified SIP request message 550-*a* of FIG. 5B. In the example of FIG. 5C, however, the session information 515-*b* may include a Presence Information Data Format-Location Object (PIDF-LO) and the telematics data 520-*b* may include an eCallData object 535. In one example, the eCallData object 535 may be referenced by a tag 530 in the header 510-*b*. In one example, the tag 530 in the header 510-*b* may use the content-ID (i.e., 1234567890@rosebud.example.com) of the eCallData object 535 to reference the eCallData object 535. In the example of FIG. 5C, the header 510-*b* may also include an indication 525 that the INVITE is for both an emergency call and an automatically-triggered eCall.

Figure 6:
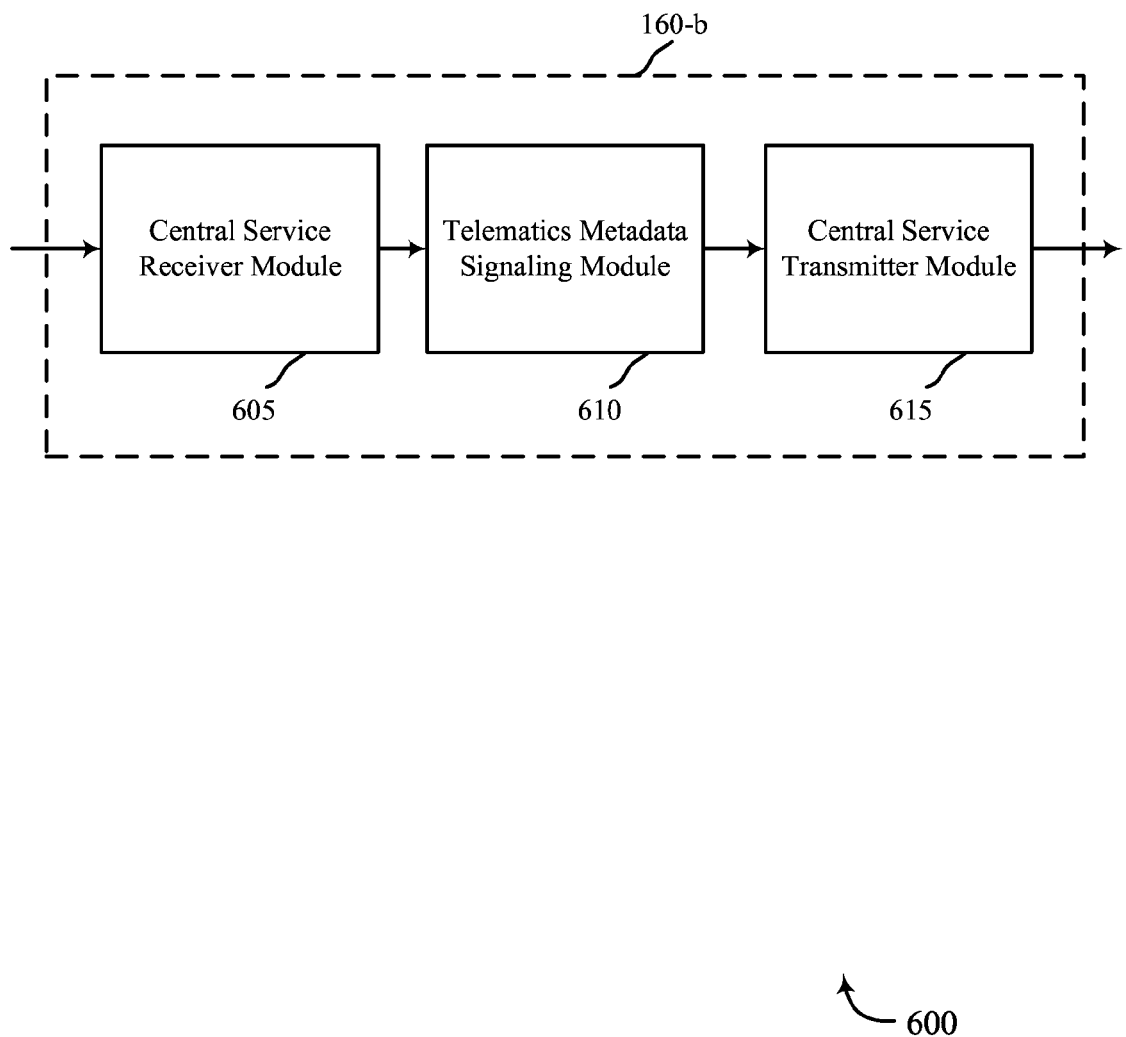
FIG. 6 is a block diagram illustrating one embodiment of a central station in accordance with the present systems and methods.

FIG. 6 is a block diagram 600 illustrating one embodiment of a central service 160-*b*, in accordance with the present systems and methods. The central service 160-*b* may be an example of the central service 160 of FIGS. 1A and/or 1B. The central service 160-*b* may include a central service receiver module 605, a telematics metadata signaling module 610, and a central service transmitter module 615. Each of these components may be in communication with each other.

These components of the central service 160-*b* may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In one configuration, the central service receiver module 605 may include a cellular receiver and/or a network interface card (NIC) and may receive communications via an Other IP Services and Networks 175 or any other IP connectivity service. In one example, the central service receiver module 605 may receive a signaling message for a communication signaling protocol that has been adapted to include telematics data. The telematics metadata signaling module 610 may extract the telematics data from the adapted signaling message. The telematics metadata signaling module 610 may also adapt a signaling message for a communication signaling protocol to include telematics metadata. The adapted signaling message for the communication signaling protocol may be transmitted via the central service transmitter module 615. Details regarding the telematics metadata signaling module 610 will be described below. In another configuration, the central service receiver module 605 may support the receipt of packet data via wireline means—e.g. from ESRP 111 in FIG. 1B.

Figure 7:
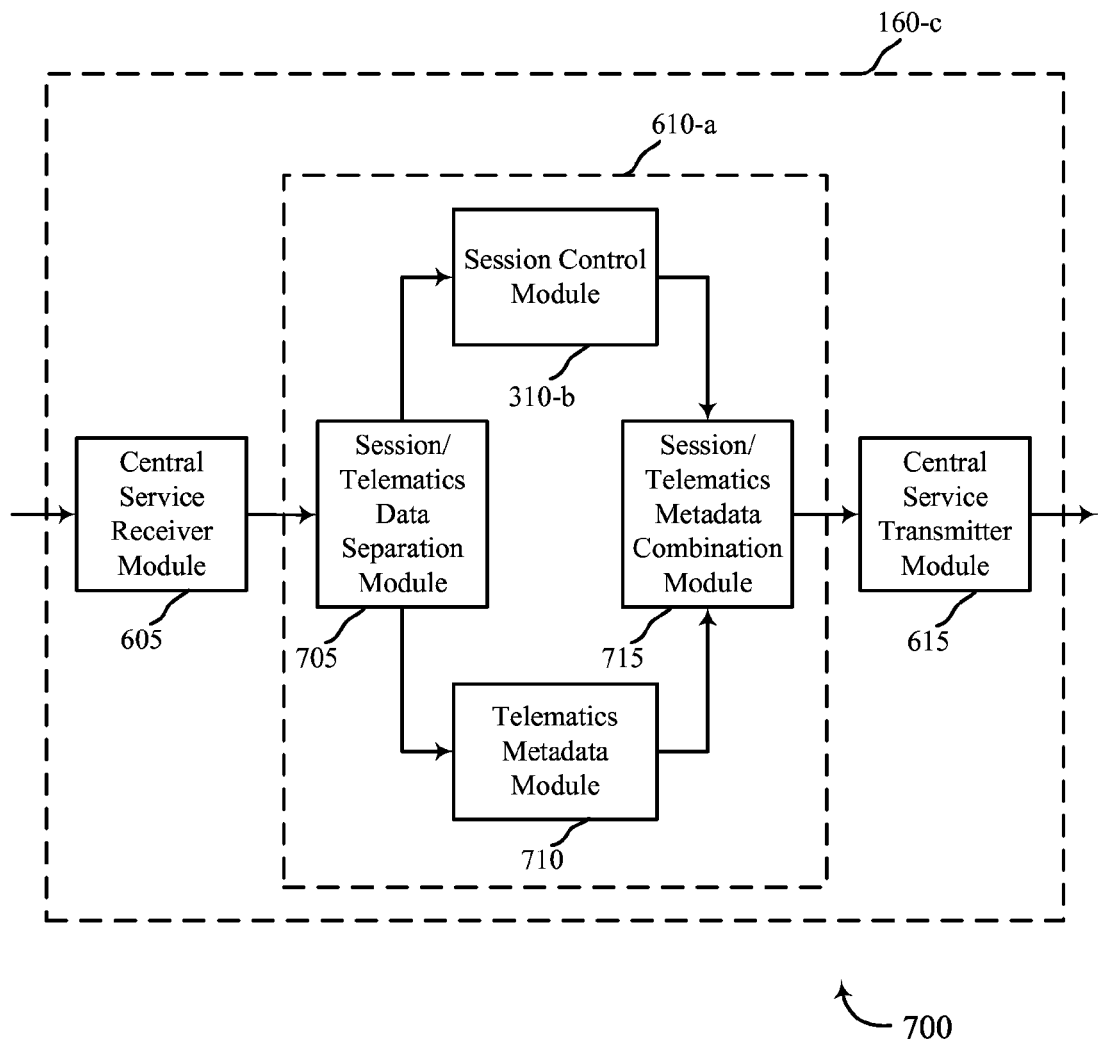
FIG. 7 is a block diagram illustrating a further embodiment of the central station.

FIG. 7 is a block diagram 700 illustrating one embodiment to of a central service 160-*c* in accordance with the present systems and methods. The central service 160-*c* may be an example of the central service 160 illustrated in FIGS. 1A, 1B, and/or 6. The central service 160-*c* may include a central service receiver module 605, a telematics metadata signaling module 610-*a*, and a central service transmitter module 615, as previously described. Each of these components may be in communication with each other.

These components of the central service 160-*c* may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In one embodiment, the telematics metadata signaling module 610-a may include a telematics metadata module 710. The telematics metadata module 710 may generate and/or obtain telematics metadata. The telematics metadata module 710 may also receive telematics data. In certain examples, the telematics metadata module 710 may generate telematics metadata based on received telematics data.

The telematics metadata signaling module 610-a may also include a session control module 310-b. The session control module 310-b may be an example of the session control module 310 illustrated in FIGS. 3 and/or 4. In one example, the session control module 310-b may obtain a signaling message that includes a set (e.g., first set) of signal information. The session control module 310-b may also generate a signaling message that includes a set (e.g., second set) of signal information.

In one embodiment, the telematics metadata signaling module 610-a may include a session/telematics data separation module 705. As noted previously, a signaling message may be adapted to include telematics data and/or telematics metadata along with the session information. For example, a signaling message may be adapted to include a first set of session information and a first set of telematics data. The session/telematics data separation module 705 may extract any telematics data from an adapted signaling message. The session/telematics data separation module 705 may provide the session information (in the form of a signaling message, for example) to the session control module 310-b and may provide the telematics data to the telematics metadata module 710.

The telematics metadata signaling module 610-a may also include a session/telematics metadata combination module 715. The session/telematics metadata combination module 715 may adapt a signaling message generated by the session control module 310-b to include telematics metadata from the telematics metadata module 710. In one example, the adapted signaling message may include a second set of session information and a first set of telematics metadata. The adapted signaling message may be transmitted via the central service transmitter module 615.

Figure 8:
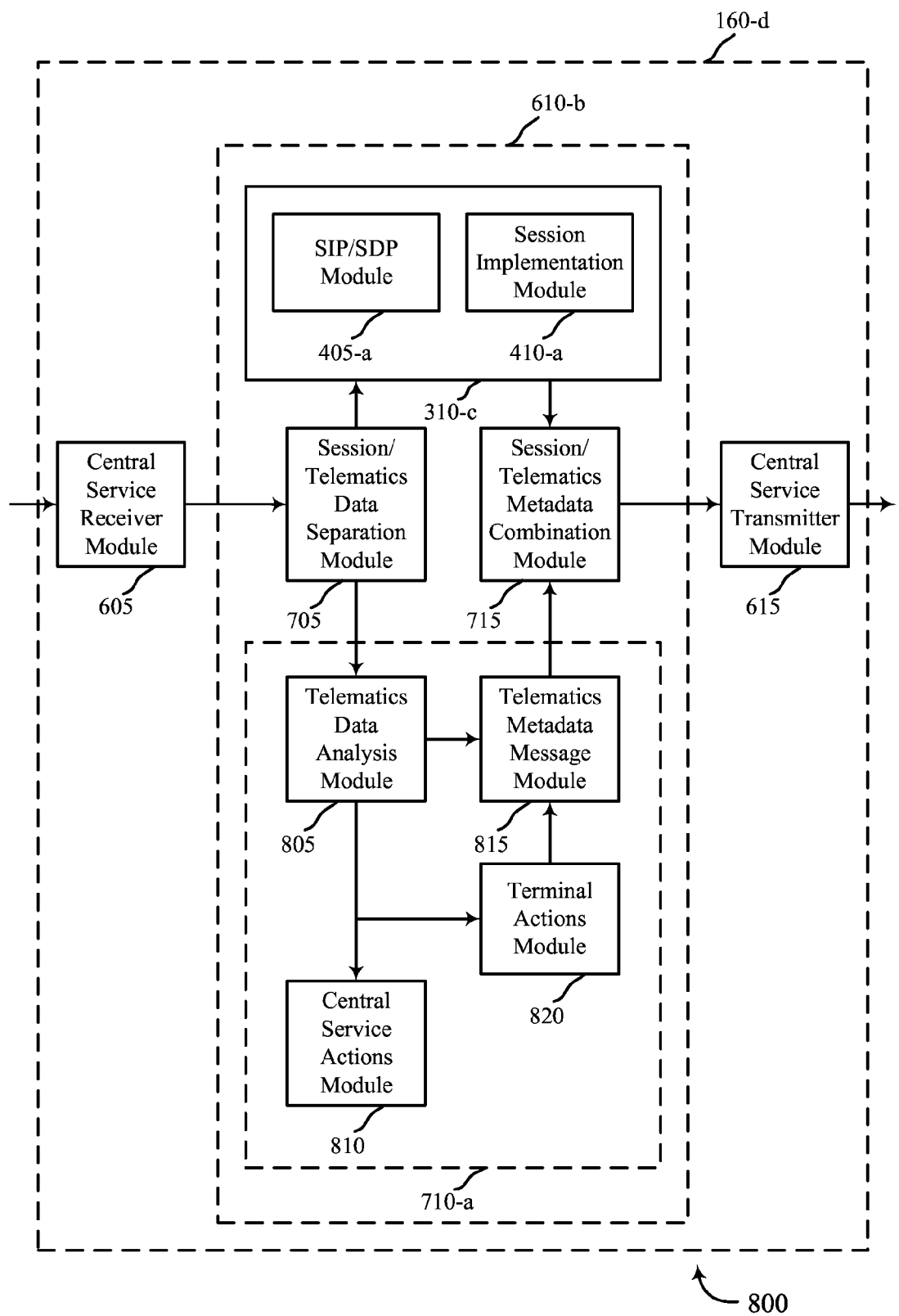
FIG. 8 is a block diagram illustrating a further example of the central station for implementing the functionality of the present systems and methods.

FIG. 8 is a block diagram 800 illustrating one embodiment of a central service 160-d in accordance with the present systems and methods. The central service 160-d may be an example of the central service 160 illustrated in FIGS. 1A, 1B, 6, and/or 7. In one configuration, the central service 160-d may include a central service receiver module 605, a telematics metadata signaling module 610-b, and a central service transmitter module 615. Each of these components may be in communication with each other.

These components of the central service 160-d may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In one example, the central service 160-d may be configured at least to receive telematics data from a terminal through an adapted use of a communication session signaling protocol, establish a communication session with the terminal, generate telematics metadata based on the content of the received telematics data, and transmit the telematics metadata to the terminal through the adapted use of the communication session signaling protocol. In certain examples, the central service 160-d may also direct the terminal via the telematics metadata to take certain action based on the received telematics data.

The telematics metadata signaling module 610-b may include a session control module 310-c. The session control module 310-c may be an example of the session control module 310 illustrated in FIGS. 3, 4, and/or 7. The session control module 310-c may include an SIP/SDP module 405-a and a session implementation module 410-a. The SIP/SDP module 405-a may be configured to negotiate, set up, manage, and terminate communication sessions with the terminal. The SIP/SDP module 405-a may generate SIP signaling message header content and SDP content to communicate session-related signaling data with the terminal. The session implementation module 410-a may be configured to receive media content (e.g., audio data for a voice call, audio and video data for a video call, text data for a text call), transmit the media content as a stream of packets to the terminal according to the negotiated session, and receive a stream of packets containing media content from the terminal according to the negotiated session.

The telematics metadata signaling module 610-b may also include a telematics metadata module 710-a. The telematics metadata module 710-a may include a telematics data analysis module 805, a central service actions module 810, a terminal actions module 820, and a telematics metadata message module 815.

The telematics data analysis module 805 may receive telematics data from the terminal and apply a set of one or more rules to identify the nature of the telematics data and determine appropriate actions to take in response to the telematics data. For example, where the terminal is associated with a vehicle, the telematics data analysis module 805 may analyze telematics data related to a vehicle type and vehicle identification number (VIN), one or more timestamps, a position estimate and associated degree of confidence, a direction of travel, a number of passengers (e.g., with fastened seatbelts), a service provider for the terminal (if any), a trigger type (e.g., deployed airbags, bumper sensors, manual trigger, fire indicators, rollover, or other situation detection, etc.), and/or other relevant information that may suit a particular application of the principles described herein. In one configuration, the telematics data analysis module 805 may provide analyzed telematics data and/or instructions to the central service actions module 810 and/or the terminal actions module 820.

The central service actions module 810 may take identified actions at the central service 160-d based on the analyzed telematics data, and the terminal actions module 820 may generate instructions for the terminal to take certain actions based on the telematics data. The telematics metadata message module 815 may generate a set of telematics metadata for transmission to the terminal based on the received telematics data. The telematics metadata message module 815 may additionally generate a set of telematics metadata for transmission to the terminal in response to a detected attempt by the terminal to transmit telematics data to the central service 160-*d*. Additionally, the telematics metadata message module 815 may format telematics metadata for transmission to the terminal according to a protocol understood by the terminal. As described above, the telematics metadata may include information such as an acknowledgement or negative acknowledgment of whether the telematics data was received at the central service 160-*d*, a request to retransmit the telematics data (e.g., the previous version and/or a current version), a request to transmit different telematics data, a request to take some other action, auxiliary data describing actions taken by the central service, and/or other relevant telematics metadata.

Returning to the example in which a terminal is associated with a vehicle and initiates an emergency call to the central service 160-*d* in response to a detected collision, crash, rollover, or other situation, the telematics data analysis module 805 may receive telematics data from the terminal indicating the type and severity of collision, the central service actions module 810 may provide (e.g., forward) information about the collision to emergency services (or other suitable destination), and the terminal actions module 820 may generate an instruction to the terminal to turn off the fuel supply of the vehicle and play a recorded message or display a text message (e.g., from central service 160-*d* or stored by the terminal) indicating that help is on its way, render media (e.g., rendering text to speech), etc. The telematics metadata message module 815 may then generate a set of telematics metadata for transmission to the terminal, where the telematics metadata acknowledges receipt of the telematics metadata, provides the instructions generated by the terminal actions module 820, and/or provides other relevant information to the terminal (e.g., an estimated time before an operator is available to take a voice and/or other media call, an estimated time before emergency services arrive, etc.).

In one embodiment, the telematics metadata signaling module 610-*b* may include a session/telematics data separation module 705. The session/telematics data separation module 705 may receive (via the central service receiver module 605, for example) a modified SIP or other communication session signaling protocol message and may separate the SIP/SDP (or other protocol) information from telematics data messages. In certain embodiments, the session/telematics data separation module 705 may provide the SIP/SDP information to the SIP/SDP module 405-*a* and the one or more telematics data messages to the telematics data analysis module 805 as described above. In one example, the session/telematics data separation module 705 may identify different portions of a modified SIP message based on information from the header of the modified SIP message. In this example, the session/telematics data separation module 705 may provide the portions identified as SIP/SDP (or other protocol) information to the SIP/SDP module 405-*a* and the portions identified as telematics data messages to the telematics data analysis module 805 as described above.

The telematics metadata signaling module 610-*b* may also include a session/telematics metadata combination module 715. The session/telematics metadata combination module 715 may combine SIP/SDP (or other protocol) information from the SIP/SDP module 405-*a* and one or more telematics metadata messages from the telematics metadata module 710-*a* into a modified SIP or other communication session signaling protocol message as described above. The central service transmitter module 615 may transmit the generated signaling messages to the terminal.

FIG. 9A, FIG. 9B, FIG. 9C, FIG. 9D, FIG. 9E, and FIG. 9F illustrate an example of a session initiation protocol (SIP) response message modified to carry both session data and telematics metadata. The SIP response message of FIGS. 9A-9F may be transmitted to a terminal 110 from a central service 160 in response to receiving a SIP request message according to the description of FIGS. 5A-5C.

Figure 9A:
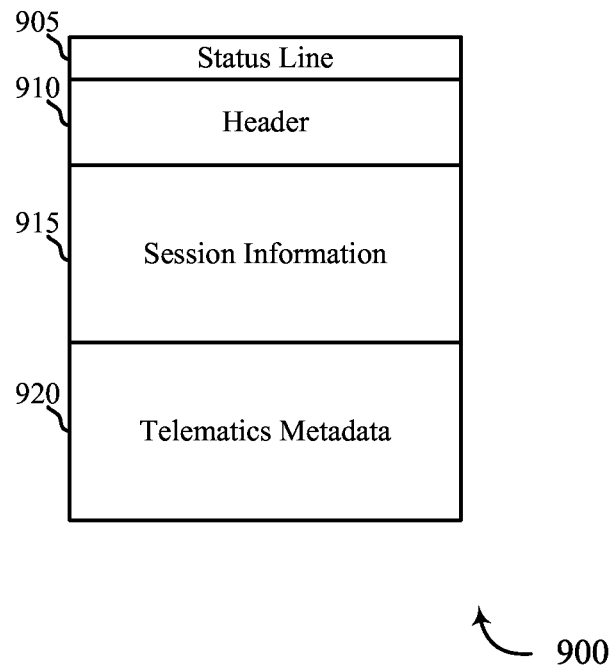
FIG. 9A shows a block diagram of an exemplary format for a response message according to a communication session signaling protocol.

By repurposing the SIP protocol to carry both session data and telematics metadata, the telematics metadata may be efficiently transmitted to a terminal without interrupting or degrading the quality of a related call. FIG. 9A shows a diagram of an example format 900 of the response message. FIG. 9B, FIG. 9C, FIG. 9D, FIG. 9E, and FIG. 9F show diagrams of example SIP response messages 950*a-e* based on the format of FIG. 9A. While the examples of FIG. 9A, FIG. 9B, FIG. 9C, FIG. 9D, FIG. 9E, and FIG. 9F are described in the context of modified and repurposed SIP response messages, it will be understood that the principles of the present description may be used to modify or extend other communication session signaling protocols (e.g., XMPP, Google Talk, MSN, etc.) or as a basis for new communication session signaling protocols.

The modified SIP response message format 900 may be used to generate signaling messages in response to SIP request messages. As shown in FIG. 9A, the modified SIP response message format 900 may include a status line 905, a header 910, a set of session data 915, and a set of telematics metadata 920. The SIP protocol defines a number of response messages, provisional responses, successful responses, redirection responses, and client failure responses. The present format 900 may be used for each of these message types and for other types of response messages.

In the example of FIG. 9B, a modified SIP 200 (OK) message 950-*a* based on the format of FIG. 9A may be used, for example, by a central service in response to receiving the modified SIP INVITE message 550 of FIG. 5B and/or FIG. 5C to indicate that the central service accepts the proposed VoIP session. The SIP 200 (OK) message 950-*a* may further provide metadata to the terminal acknowledging receipt of the telematics data transmitted in the SIP INVITE message 550. The SIP 200 (OK) message 950-*a* may also provide additional information (that emergency services have been notified and voice confirmation is pending, for example).

The status line 905-*a* of the example SIP 200 (OK) signaling message 950-*a* may identify the message 950-*a* as a SIP response and specify the type of response that is being made (e.g., OK). The header 910-*a* of the response message may provide the identity of the terminal and the central service, the call identifier, contact information for the terminal and the central service, the call sequence number, an indication of the type of data in the body, and a length of the response message 950-*a* message. In the present example, the header 910-*a* may specify that the body contains mixed data with the character string "-----NextPart-----" indicating the boundary between the different types of data in the body. In the present example, the body of the message includes both session data 915-*a* and telematics metadata 920-*a*.

The session data 915-*a* may include of list of agreed upon parameters for the proposed session between the terminal and the central service. These session parameters may be a set of Session Description Protocol (SDP) parameters for the VoIP audio call.

The telematics metadata 920-*a* may include information related to the telematics data received at the central service in the SIP INVITE signaling message 550. As described previously, the telematics metadata 920-*a* may include an acknowledgement of whether the telematics data was received at the central service, a request to retransmit the telematics data, a request to transmit different telematics data, a request to take some other action, auxiliary data describing actions taken by the central service, and/or other relevant telematics metadata. Returning to the example of an emergency call made from a terminal associated with a vehicle to a PSAP service, the telematics metadata 920-*a* shown in FIG. 9B may include an acknowledgment that the telematics data was received and a status code indicating that emergency services have been notified and that a voice call is pending.

FIG. 9C shows an example modified SIP response message 950-*b* similar to the modified SIP response message 950-*a* of FIG. 9B. In the example of FIG. 9C, however, the telematics metadata 920-*b* may further include an instruction to the terminal to take certain actions with respect to any vehicle associated with the terminal. Thus, the telematics metadata 920-*b* of FIG. 9C may include an instruction to turn off an ignition of the vehicle, turn off a fuel pump of the vehicle, unlock the doors of the vehicle, and play a specified recording of instructions to the occupants of the vehicle. In some configurations, the instructions to the terminal may come from a human. For example, a human that is taking the call may cause commands to be sent to the terminal, which may include requests for updated or additional telematics data, one or more messages to be communicated to the vehicle (such as by displaying text, rendering text to speech, playing a recording, playing media) including pre-defined or fully dynamic messages (e.g., typed by a human on the spot), locking/unlocking doors, triggering lights/horn, etc.

FIG. 9D shows the status line 905-*c* and header 910-*c* of an example modified SIP response message 950-*c* similar to the modified SIP response message 950-*a* of FIG. 9B. In the example of FIG. 9C, however, the header 910-*c* further includes a P-header for eCallMetaData 925. In this example, the P-header for eCallMetaData 925 may include an acknowledgement 930 that acknowledges receipt of data with the specified ID, a command 935 to play a static message, a command 940 to get noticed (e.g., flash lights, honk horn, make noise, etc.), and a command 945 to send eCall data AltSet1. In one example, the static message may be stored on the terminal and/or a known location.

FIG. 9E shows an example modified SIP response message 950-*d* similar to the modified SIP response message 950-*a* of FIG. 9B. In the present example, the header 910-*d* may include a P-header for eCallMetaData 925-*a* similar to the P-header for eCallMetaData 925 of FIG. 9D. In the example of FIG. 9E, however, the P-header for eCallMetaData 925-*a* may include a command 955 to play a dynamic message and a reference 960 that indicates the content ID (i.e., 5432154321@example.gov) of the dynamic message that should be played. In this example, the dynamic media may be included in the body (e.g., the telematics metadata 920-*d*) of the response message 950-*d*. As indicated previously, the dynamic media object 965 may have and may be referenced by a specific content ID.

FIG. 9F shows an example modified SIP response message 950-*e* similar to the modified SIP response message 950-*a* of FIG. 9B. In the example of FIG. 9F, however, the telematics metadata (e.g., eCall metadata) may be included in the body (e.g., telematics metadata 920-*e*). The present example additionally illustrates that both static messages and dynamic messages may be included in a telematics metadata object (e.g., eCallMetaData object). In this example, the header 910-*e* may include a tag 970 that references an telematics metadata object 975 in the body (e.g., telematics metadata 920). For example, the tag 970 may reference the telematics metadata object 975 by referencing the content ID (i.e., 9876543210@example.gov) of the telematics metadata object 975. In this example, the telematics metadata 920-*b* may include the telematics metadata object 975. In the present example, the telematics metadata object 975 may include an acknowledgement 930-*a* that acknowledges receipt of data with the specified ID, a command 935-*a* to play a static message, a command 955-*a* to play a dynamic message, a dynamic media object 965-*a*, a command 940-*a* to get noticed (e.g., flash lights, honk horn, make noise, etc.), and a command 945-*a* to send eCall data AltSet1. In one configuration, the telematics metadata object 975 may be formed using a markup language (e.g., Extensible Markup Language (XML)). It is noted that the telematics metadata object 975 may be formed using many other encoding or structuring mechanisms such as ASN.1, JSON, MIME, etc.

While the examples of FIGS. 5A, 5B, 5C, 9A, 9B, 9C, 9D, 9E, and 9F illustrate the example of a modified SIP request message carrying telematics data and a modified SIP response message carrying telematics metadata, it will be recognized by those skilled in the art that either type of message may carry telematics data or telematics metadata. For example, in certain examples, a terminal may transmit telematics data to a central service in a message responding to a request from the central service. Similarly, in certain examples the central service may transmit telematics metadata to the terminal in a request message to the terminal. In additional or alternative examples, a request message or a response message may include both telematics data and telematics metadata.

Figure 10:
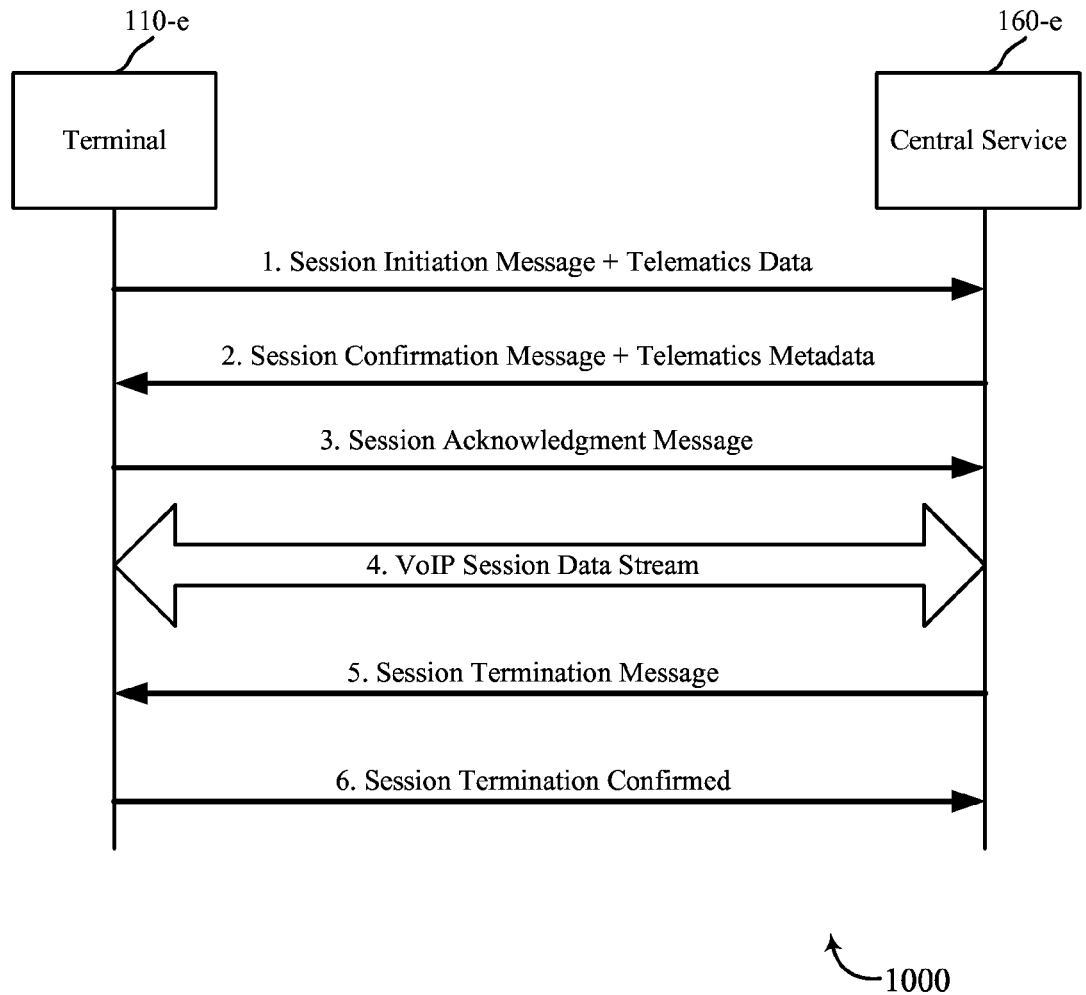
FIG. 10 shows a diagram of an exemplary communications exchange between a terminal and a server.

FIG. 10 is a diagram of one example of a communications exchange between a terminal 110-*e* and a central service 160-*e* for the exchange of telematics data and telematics metadata using a communication session signaling protocol. Terminal 110-*e* may be an example of the terminal 110 of FIGS. 1A, 1B, 2, 3, and/or 4, and central service 160-*e* may be an example of the central service 160 (e.g., PSAP) of FIGS. 1A, 1B, 6, 7, and/or 8, or another central service. In certain examples, central service 160-*e* may be implemented by one or more servers.

The communication session signaling protocol may be an application layer protocol designed to be independent of the underlying transport layer. As such, in certain examples the communication session signaling protocol may be compatible with a number of different transport layer protocols. In certain examples, one or more proxy servers may be disposed intermediate terminal 110-*e* and central service 160-*e* such that initial signaling messages between terminal 110-*e* and central service 160-*e* may be forwarded between one or more of the proxy servers. For the sake of clarity, such proxy servers are not shown in the Figures associated with the present description. It is noted that there may be other (e.g., additional) entities that receive, forward, regenerate, alter, or are otherwise involved in the message exchange (for example, in the case of SIP messaging, back to back user agents, session border controllers, etc.). In FIG. 10 the communication session signaling protocol may be SIP, XMPP, Google Talk, Skype etc. and the underlying transport protocols may be User Datagram Protocol (UDP) over IP or Transmission Control Protocol (TCP) over IP or some other set of transport protocols.

The terminal 110-*e* may communicate with the central service over the communication session signaling protocol to set up and manage a communication session. In the present example, terminal 110-*e* and central service 160-*e* may communicate to establish a VoIP session for a call (carrying voice and/or other media) between a user associated with terminal 110-*e* and an operator associated with central service 160-*e*. As shown in FIG. 10, terminal 110-*e* may transmit a session initiation signaling message to central service 160-*e*. The session initiation signaling message may invite central service 160-*e* to participate in a VoIP session with terminal 110-*e*. Terminal 110-*e* may transmit the session initiation message in response to a manual request from a user associated with terminal 110-*e*. For example, an occupant of a vehicle associated with terminal 110-*e* may press an emergency call button in the vehicle that signals terminal 110-*e* to invite central service 160-*e* to the VoIP session. Additionally or alternatively, terminal 110-*e* may transmit the session initiation message to central service 160-*e* in response to one or more detected or inferred conditions or events (e.g., airbags deployed, collision sensor, engine diagnostic data, engine fire, vehicle fire, rollover, or other situation, etc.).

The session initiation message may include details and parameters for the proposed session (e.g., network addresses, port numbers, type of media, timing, streaming protocols supported, bandwidth, etc.). In addition to this set of session data for the proposed session between terminal 110-*e* and central serviced 160-*e*, terminal device 110-*e* may append (e.g., add) telematics data to the session initiation message transmitted to central service 160-*e*. The telematics data may include readings from one or more sensors in communication with terminal 110-*e* and/or other data stored, determined, calculated, and/or received by terminal 110-*e*. In certain examples, the telematics data may include data typically transmitted to a PSAP during an eCall or other emergency call. For example, the telematics data may include at least one or more of: how the eCall was initiated, a vehicle type and vehicle identification number (VIN), a timestamp, a position estimate and position confidence flag, the direction of travel, the number of passengers (e.g., from seat occupancy sensors) and associated data (e.g., seats with fastened seatbelts), a service provider for the terminal (if any), a trigger type (e.g., deployed airbags, bumper sensors, fire indicators, rollover, or other situation detection, etc.), and/or other relevant information that may suit a particular application of the principles described herein.

Upon receiving the session initiation message with the appended telematics data, central service 160-*e* may determine whether to accept or reject the proposed session. In the present example, central service 160-*e* may transmit a session confirmation message over the communication session signaling protocol indicating that the proposed session is accepted in addition to providing further parameters and data for the session. Additionally, the session confirmation message transmitted to terminal 110-*e* may include a set of telematics metadata associated with the set of telematics data received by central service 160-*e* in the session initiation message. In alternative examples, the central service 160-*e* may transmit the telematics metadata to the central service 160-*e* in a separate message (e.g., in a communication session signaling protocol message specifically used to transmit the telematics metadata, appended to a different type of communication session signaling protocol message, etc.). The telematics metadata may, for example, contain an acknowledgment of whether the telematics data was received at the central service 160-*e*, a request to retransmit the telematics data (e.g., the previous version and/or a current version) to the central service 160-*e*, a request to transmit different telematics data to the central service 160-*e*, a request to take some other action, auxiliary data describing actions taken by the central service 160-*e*, and/or other relevant telematics metadata.

Terminal 110-*e* may receive the telematics metadata and take appropriate action based on the content of the received telematics metadata. In certain examples, the telematics metadata may simply confirm receipt of the telematics data, and terminal 110-*e* may take no action in response to the telematics metadata. In other examples, terminal 110-*e* may respond to a request in the telematics metadata from central service 160-*e* or consult a set of rules to identify an action to take based on the received telematics metadata.

Additionally, terminal 110-*e* may establish a VoIP session with central service 160-*e* based on the session data and parameters in both the session initiation message and the session confirmation message. Terminal 110-*e* and central service 160-*e* may exchange streams of packets containing voice and/or other media data using Real-time Transport Protocol (RTP) or another streaming protocol to implement a call (carrying voice and/or other media) between the user of terminal 110-*e* and the operator of central service 160-*e*. The VoIP session may carry any media including text, both message-at-a-time text (such as instant messaging) and character-at-a-time (streaming text, often called real-time text), and/or video. It is noted that while most media is streamed, the VoIP session may also carry non-streamed media either in addition to or instead of streamed media.

To conclude the VoIP session, central service 160-*e* may transmit a session termination signaling message to terminal 110-*e* over the communication session signaling protocol. Upon receiving the session termination signaling message, terminal 110-*e* may transmit a session termination confirmation signaling message to central service 160-*e*, and the session may terminate.

Figure 11:
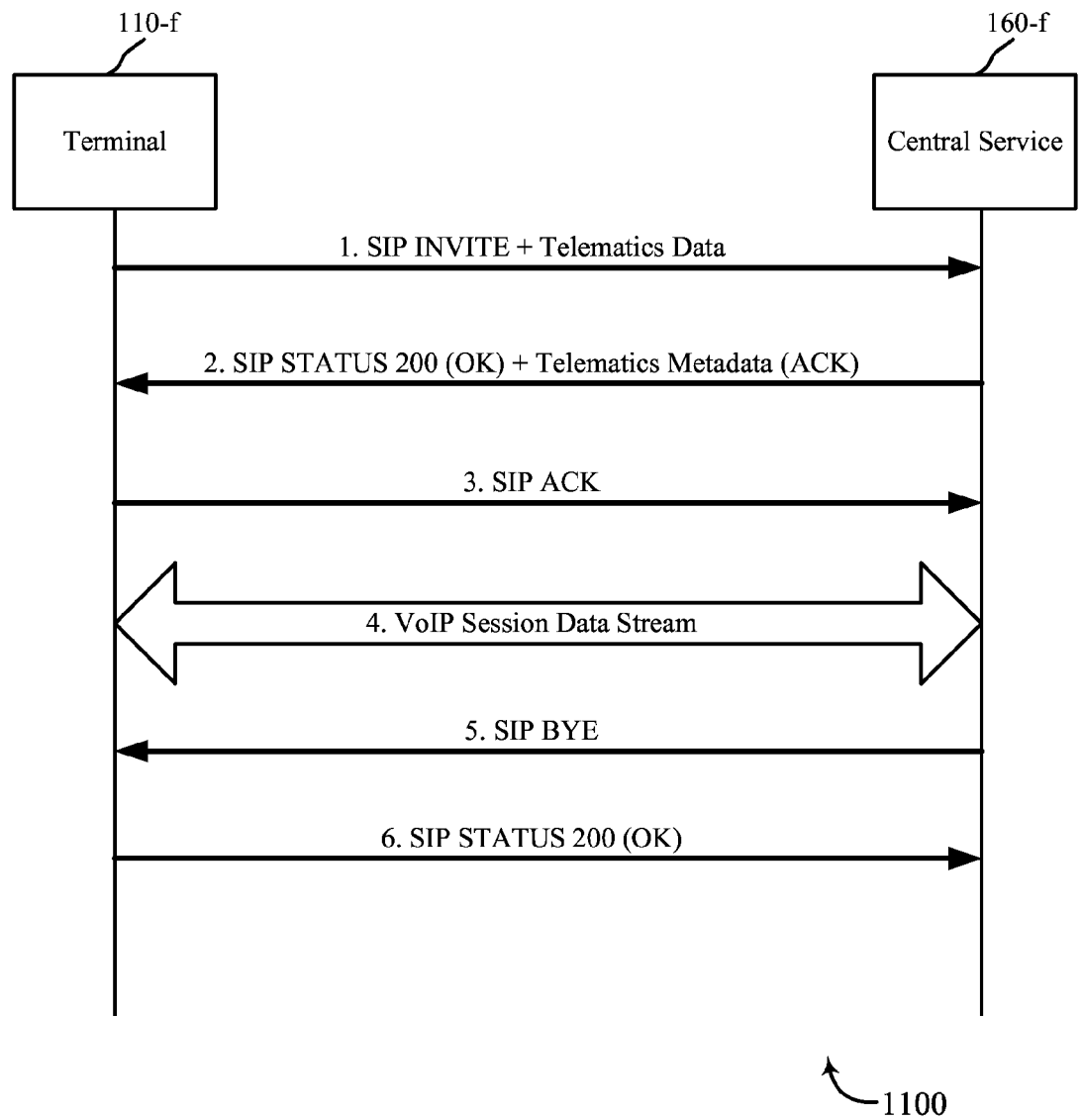
FIG. 11 shows a diagram of an exemplary communications exchange between a terminal and a server.

FIG. 11 is a diagram of an example of a communications exchange 1100 between a terminal 110-*f* and a central service 160-*f* using a communication session signaling protocol to both a) set up a VoIP call and b) exchange telematics data and telematics metadata. Similar to previous examples, the communication session signaling protocol may be a version of SIP modified to carry telematics data and telematics metadata. In other examples (not shown in FIG. 11), other communication session signaling protocols may be used.

Terminal 110-*f* may be an example of the terminal 110 of FIG. 1A or one of the other terminals 110 described above with reference to previous Figures. Central service 160-*f* may be an example of the central service (e.g., PSAP) 160 of FIG. 1A or one of the other central services 160 described above with reference to previous Figures. In certain examples, central service 160-*f* may be implemented by one or more servers. Additionally, in certain examples, one or more proxy servers may be disposed between terminal 110-*f* and central service 160-*f* to forward the communication session signaling protocol messages between terminal 110-*f* and central service 160-*f*.

At a first stage, terminal 110-*b* may transmit a SIP INVITE message to central service 160-*f*. In certain examples, the SIP INVITE message may be an example of the modified SIP request message described above with reference to FIGS. 5A, 5B, and 5C. The SIP INVITE message may simultaneously invite central service 160-*f* to a proposed VoIP session having a proposed set of parameters and convey a set of telematics data from terminal 110-*f* to central service 160-*f*. In certain examples, terminal 110-*f* may be associated with a vehicle and may transmit the SIP INVITE message to central service 160-*f* in response to a detected condition at the vehicle or a manual request for an emergency call by an occupant of the vehicle.

At a second stage, central service 160-*f* may respond to the SIP INVITE message by transmitting a SIP STATUS 200 (OK) message to terminal 110-*f*. The SIP STATUS 200 (OK) message may simultaneously agree to the proposed VoIP session and convey telematics metadata to terminal 110-*f* acknowledging receipt of the telematics data by central service 160-*f*. At a third stage, upon receiving the SIP STATUS 200 (OK) message including the telematics metadata from central service 160-*f*, terminal 110-*f* may transmit a SIP ACK message to central service 160-*f*. At a fourth stage, the VoIP session may be implemented by streaming packets of session data carrying voice and/or other media communications between terminal 110-*f* and central service 160-*f* according to parameters agreed to in the SIP INVITE, SIP STATUS 200 (OK), and SIP ACK messages. At a fifth stage, the VoIP session may be terminated by central service 160-*f* transmitting a SIP BYE message to terminal 110-*f*. Terminal 110-*f* may confirm the termination of the session at a sixth stage by transmitting a SIP STATUS 200 (OK) response message to central service 160-*f*. In other examples, terminal 110-*f* may initiate termination of the VoIP session, and central service 160-*f* may transmit the SIP STATUS 200 (OK) response message to terminal 110-*f*.

Figure 12:
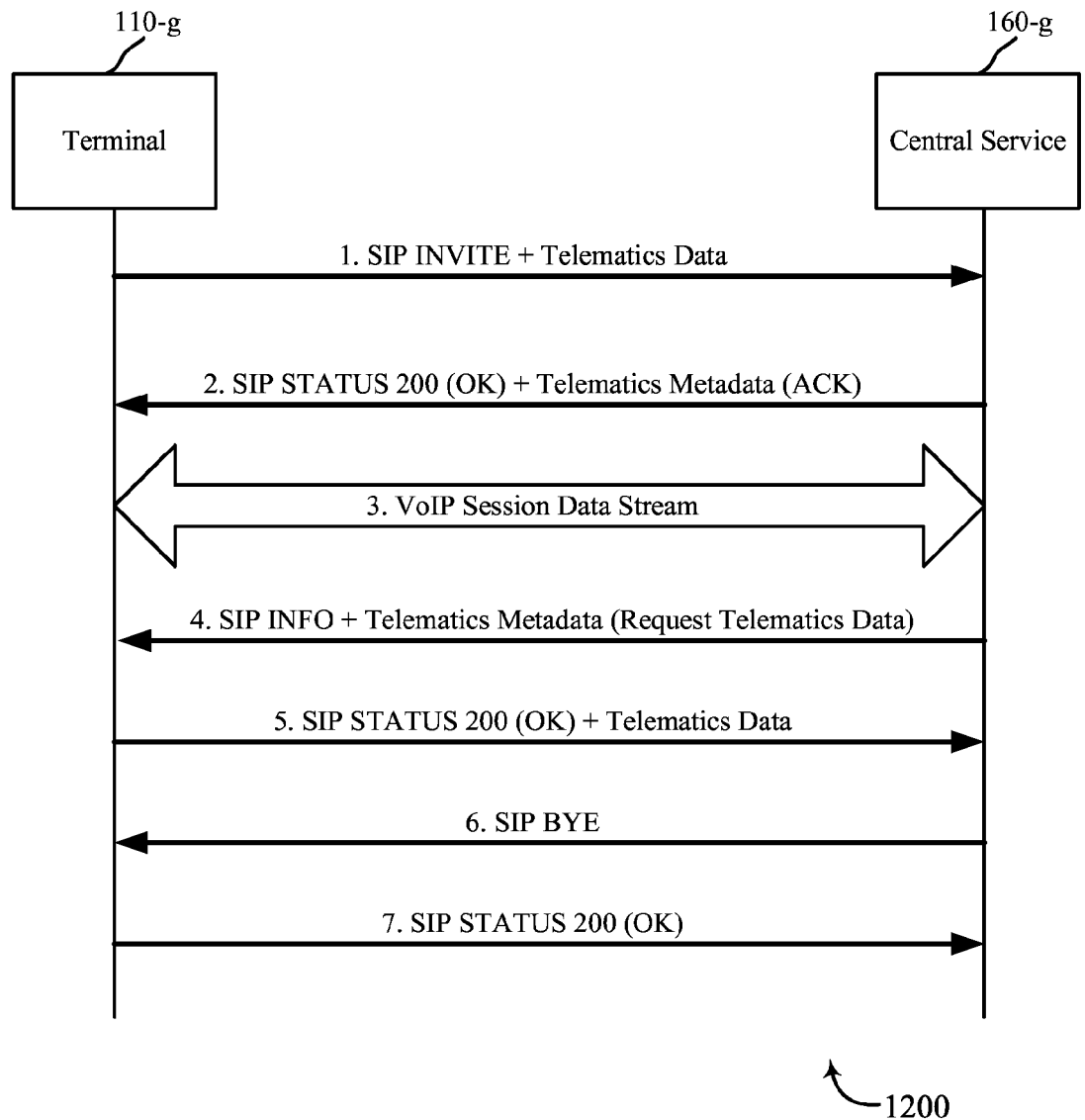
FIG. 12 shows a diagram of an exemplary communications exchange between a terminal and a server.

FIG. 12 is a diagram of an example of a communications exchange 1200 between a terminal 110-*g* and a central service 160-*g* using a communication session signaling protocol to both a) set up a VoIP call and b) exchange telematics data and telematics metadata. Similar to previous examples, the communication session signaling protocol may be a version of SIP modified to carry telematics data and telematics metadata. In other examples, other communication session signaling protocols may be used.

Terminal 110-*g* may be an example of the terminal 110 of FIG. 1A or one of the other terminals 110 described above with reference to previous Figures. Central service 160-*g* may be an example of the central service 160 of FIG. 1A or one of the other central services 160 described above with reference to previous Figures. In certain examples, central service 160-*g* may be implemented by one or more servers. Additionally, in certain examples, one or more proxy servers may be disposed between terminal 110-*g* and central service 160-*g* to forward the communication session signaling protocol messages between terminal 110-*g* and central service 160-*g*.

At a first stage, terminal 110-*g* may transmit a SIP INVITE message to central service 160-*g*. In certain examples, the SIP INVITE message may be an example of the modified SIP request message described above with reference to FIGS. 5A, 5B, and 5C. The SIP INVITE message may simultaneously invite central service 160-*g* to a proposed VoIP session having a proposed set of parameters and convey a set of telematics data from terminal 110-*g* to central service 160-*g*. In certain examples, terminal 110-*g* may be associated with a vehicle and may transmit the SIP INVITE message to central service 160-*g* in response to a detected condition at the vehicle or a manual request for an emergency call by an occupant of the vehicle.

At a second stage, central service 160-*g* may respond to the SIP INVITE message by transmitting a SIP STATUS 200 (OK) message to terminal 110-*g*. The SIP STATUS 200 (OK) message may simultaneously agree to the proposed VoIP session and convey telematics metadata to terminal 110-*g* acknowledging receipt of the telematics data by central service 160-*g*. At a third stage, the VoIP session may be implemented by streaming packets of session data carrying voice and/or other media communications between terminal 110-*g* and central service 160-*g* according to parameters agreed to in the SIP INVITE and SIP STATUS 200 (OK) messages.

At a fourth stage, central service 160-*g* may transmit a SIP INFO message to terminal 110-*g* with additional telematics metadata. In one example, the additional telematics metadata may request additional telematics data beyond what was included in the initial SIP INVITE message. In another example, the additional telematics metadata may additionally include instructions for the terminal 110-*g* and/or vehicle to carry out. At a fifth stage, terminal 110-*g* may transmit a SIP STATUS 200 (OK) message to central service 160-*g* with the requested additional telematics data.

At a sixth stage, the VoIP session may be terminated by central service 160-*g* transmitting a SIP BYE message to terminal 110-*g*. Terminal 110-*g* may confirm the termination of the session at a seventh stage by transmitting a SIP STATUS 200 (OK) response message to central service 160-*g*. In other examples, terminal 110-*g* may initiate termination of the VoIP session, and central service 160-*g* may transmit the SIP STATUS 200 (OK) response message to terminal 110-*g*.

Figure 13:
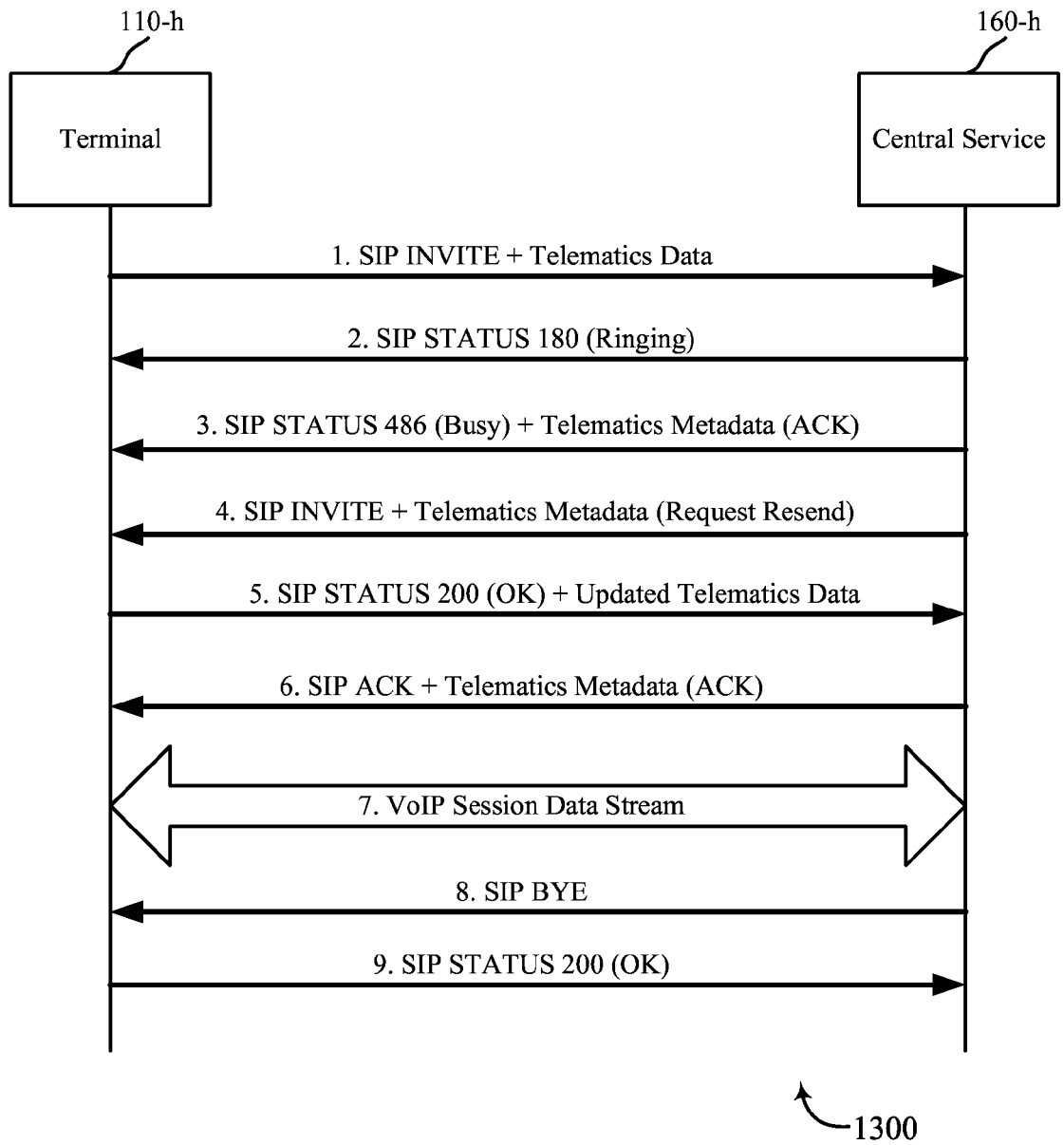
FIG. 13 shows a diagram of an exemplary communications exchange between a terminal and a server.

FIG. 13 is a diagram of another example of a communications exchange 1300 between a terminal 110-*h* and a central service 160-*h* using a communication session signaling protocol to both a) set up a VoIP call and b) exchange telematics data and telematics metadata. Similar to previous examples, the communication session signaling protocol may be a version of SIP modified to carry telematics data and telematics metadata. In other examples, other communication session signaling protocols may be used.

Terminal 110-*h* may be an example of the terminal 110 of FIG. 1A or one of the other terminals 110 described above with reference to previous Figures. Central service 160-*h* may be an example of the central service 160 of FIG. 1A or one of the other central services 160 described above with reference to previous Figures. In certain examples, central service 160-*h* may be implemented by one or more servers. Additionally, in certain examples, one or more proxy servers may be disposed between terminal 110-*h* and central service 160-*h* to forward the communication session signaling protocol messages between terminal 110-*h* and central service 160-*h*.

At a first stage, terminal 110-*h* may transmit a SIP INVITE message to central service 160-*h*. The SIP INVITE message may be an example of a modified SIP request message described above with reference to previous Figures. The SIP INVITE message may simultaneously invite central service 160-*h* to a VoIP session with a proposed set of parameters and convey a set of telematics data from terminal 110-*h* to central service 160-*h*.

At a second stage, central service 160-*h* may respond to the SIP INVITE message by transmitting a SIP STATUS 180 (Ringing) response message to terminal 110-*h*. In certain examples, the SIP STATUS 180 (Ringing) response message may indicate that central service 160-*h* is attempting to page a human operator to answer the VoIP call. If central service 160-*h* is unable to reach a human operator to answer the call, central service 160-*h* may transmit a SIP STATUS 486 (Busy) response message to terminal 110-*h* at a third stage. In alternative examples, the central service 160-*h* may accept the call with a SIP STATUS 200 (OK) response message but place the call in a queue while waiting for a human operator to become available. The SIP STATUS 486 (Busy) or, alternatively, the SIP STATUS 200 (OK) response message may contain telematics metadata related to the telematics data transmitted to central service 160-*h* from terminal 110-*h*.

The telematics metadata may acknowledge to terminal 110-*h* that the telematics data was received by central service 160-*h*. Accordingly, terminal 110-*h* may in certain examples indicate to a user of terminal 110-*h* that the telematics data has been successfully received (received in a satisfactory state, for example) at central service 160-*h*. Thus, even though no operator associated with central service 160-*h* may be available to take a voice and/or other media call, the user may be assured that the telematics data has been received at central service 160-*h*. In certain other embodiments, where there may be no user in control of terminal 110-*h* (e.g. where a call was invoked by terminal 110-*h* in response to sensor data), the telematics metadata acknowledgment may confirm to terminal 110-*h* that the telematics data was received and there is thus no need for terminal 110-*h* to attempt an automatic repeat attempt. This may reduce load on central service 160-*h* when many such terminals 110-*h* are attempting to place emergency calls and send telematics data at the same time—e.g. in response to a very severe incident (e.g. multi-vehicle pile up on a highway) or a disaster situation such as an earthquake, hurricane, tsunami, or wildfire.

In one example, the central service 160-*h* may determine if the telematics data has been received in a satisfactory state (e.g., satisfactorily received). Examples of satisfactory states may be a complete reception of a transmitted set of data (as a result of an error-free transmission, for example). In some cases, a less than complete set of data may qualify as a satisfactory state, while in other cases, a less than complete set of data may not qualify as a satisfactory state. In some cases, the determination of a satisfactory state may be based on the situation in which the telematics data was transmitted in (as determined by the content of the received set of telematics data, for example). Additionally or alternatively, the determination of a satisfactory state may be based on factors such as whether values are consistent with each other or consistent with typical ranges, whether the location data has a high enough confidence, whether the telematics data are sufficiently current, etc. In some cases, the determination of a satisfactory state may be made by a human (e.g., an operator) at the central service 160-*h*. In other cases, the determination of a satisfactory state may be made automatically (by the central service, for example).

For example, returning to the example of a terminal 110-*h* associated with a vehicle emergency calling system, a vehicle occupant may experience a collision and provide a manual indication to terminal 110-*h* that an emergency voice and/or other media call to central service 160-*h* is desired. The telematics data transmitted to central service 160-*h* may include at least the latitude and longitude of the vehicle and an indication that a collision has occurred. If the central service 160-*h* is experiencing a high volume of calls and unable to provide a human operator to answer the call, the vehicle occupant may still receive assurance that her location and information about the collision was received at the central service 160-*h*. For instance, the terminal 110-*h* may receive a SIP STATUS 486 (Busy) message that includes telematics metadata (instructing the terminal 110-*h* to communicate to the user that the data was received at the central service 160-*h*, for example). In certain examples, the telematics metadata may also communicate other useful information to the user through terminal 110-*h*, including a message that emergency services have been dispatched (or are in the area of the user handling other incidents and will subsequently attend to the user) or an instruction to remain in the vehicle. In one example, the telematics metadata may additionally or alternatively provide instructions to the vehicle such as killing the ignition or locking the doors (for safety) or flashing the lights (to help emergency services locate the vehicle).

At a fourth stage, central service 160-*h* may determine that an operator is available to participate in a VoIP call with the user of terminal 110-*h*, and if the call is not already queued or on hold, central service 160-*h* may attempt to call terminal 110-*h* back by transmitting a SIP INVITE message to terminal 110-*h*, the SIP INVITE message proposing a new VoIP session. The SIP INVITE message may include an additional set of telematics metadata related to the received telematics data. In the present example, the additional set of telematics metadata may include a request that terminal 110-*h* retransmit the telematics data to allow central service 160-*h* to evaluate the most up-to-date version of the telematics data.

At a fifth stage, terminal 110-*h* may accept the invitation to the new VoIP session proposed by central service 160-*h* by transmitting a SIP STATUS 200 (OK) message to central service 160-*h*, where the SIP STATUS 200 (OK) message also contains the requested updated telematics data. At a sixth stage, central service 160-*h* may transmit a SIP ACK to terminal 110-*h* with a new set of telematics metadata acknowledging receipt of the updated telematics data. At a seventh stage, the VoIP call between terminal 110-*h* and central service 160-*h* may take place over one or more VoIP session data streams. At the conclusion of the call, central service 160-*h* may transmit a SIP BYE message to terminal 110-*h*, and terminal 110-*h* may acknowledge the end of the call by transmitting a SIP STATUS 200 (OK) message to central service 160-*h*.

In an alternative example, central service 160-*h* may not establish a call session with terminal 110-*h* after transmitting the SIP STATUS 486 (Busy) response message to terminal 110-*h* at stage 3. Nevertheless, terminal 110-*h* may rely on the telematics metadata received at stage 3 to determine that the telematics data was received by central service 160-*h* and that appropriate action is being taken.

Figure 14:
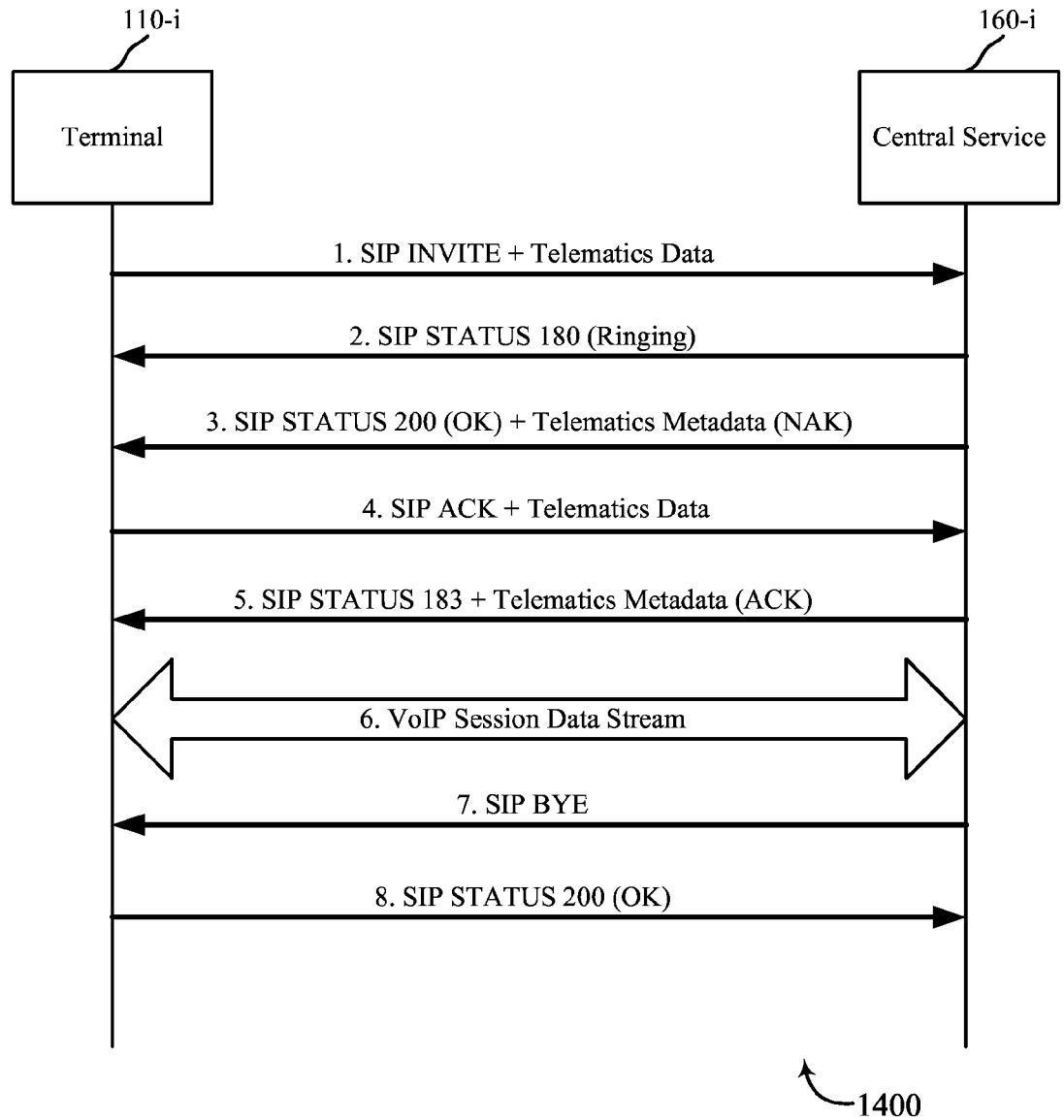
FIG. 14 shows a diagram of an exemplary communications exchange between a terminal and a server.

FIG. 14 is a diagram of another example of a communications exchange 1400 between a terminal 110-*i* and a central service 160-*i* using a communication session signaling protocol to both a) set up a VoIP call and b) exchange telematics data and telematics metadata. Similar to previous examples, the communication session signaling protocol may be a version of SIP modified to carry telematics data and telematics metadata. In other examples, other communication session signaling protocols may be used.

Terminal 110-*i* may be an example of the terminal 110 of FIG. 1A or one of the other terminals 110 described above with reference to previous Figures. Central service 160-*i* may be an example of the central service 160 of FIG. 1A or one of the other central services 160 described above with reference to previous Figures. In certain examples, central service 160-*i* may be implemented by one or more servers. Additionally, in certain examples, one or more proxy servers may be disposed between terminal 110-*i* and central service 160-*i* to forward the communication session signaling protocol messages between terminal 110-*i* and central service 160-*i*.

At a first stage, terminal 110-*i* may transmit a SIP INVITE message to central service 160-*i*. The SIP INVITE message may simultaneously invite central service 160-*i* to a proposed VoIP session with a proposed set of parameters and convey a set of telematics data from terminal 110-*i* to central service 160-*i*. At a second stage, central service 160-*i* may transmit a SIP STATUS 180 (Ringing) response message to terminal 110-*i*. At a third stage, central service 160-*i* may transmit a SIP STATUS 200 (OK) message to terminal 110-*i* to indicate acceptance of the proposed VoIP session. The SIP STATUS (OK) message may also contain telematics metadata indicating that the telematics data transmitted by terminal 110-*i* was not received (e.g., not satisfactorily received) (i.e., a NAK response). In some cases, the telematics metadata may additionally include instructions for the terminal, messages, etc. Consequently, at a fourth stage, terminal 110-*i* may transmit a SIP ACK message confirming the VoIP session and retransmitting the telematics data. In certain examples, the retransmitted telematics data may be the same telematics data originally sent with the SIP INVITE message. Alternatively, the retransmitted telematics data may be updated or otherwise different from the original telematics data.

At a fifth stage, central service 160-*i* may transmit a SIP STATUS 183 (SESSION IN PROGRESS) method containing telematics metadata acknowledging that the retransmitted telematics data has been received at central service 160-*i*. At a sixth stage, the VoIP call may be implemented by the negotiated VoIP session through which streaming voice and/or other media data may be exchanged between terminal 110-*i* and central service 160-*i*. At a seventh stage and the conclusion of the VoIP call, central service 160-*i* may transmit a SIP BYE message to terminal 110-*i*. At an eighth stage, terminal 110-*i* may respond with a SIP STATUS 200 (OK) message to confirm that the VoIP session has ended.

Figure 15:
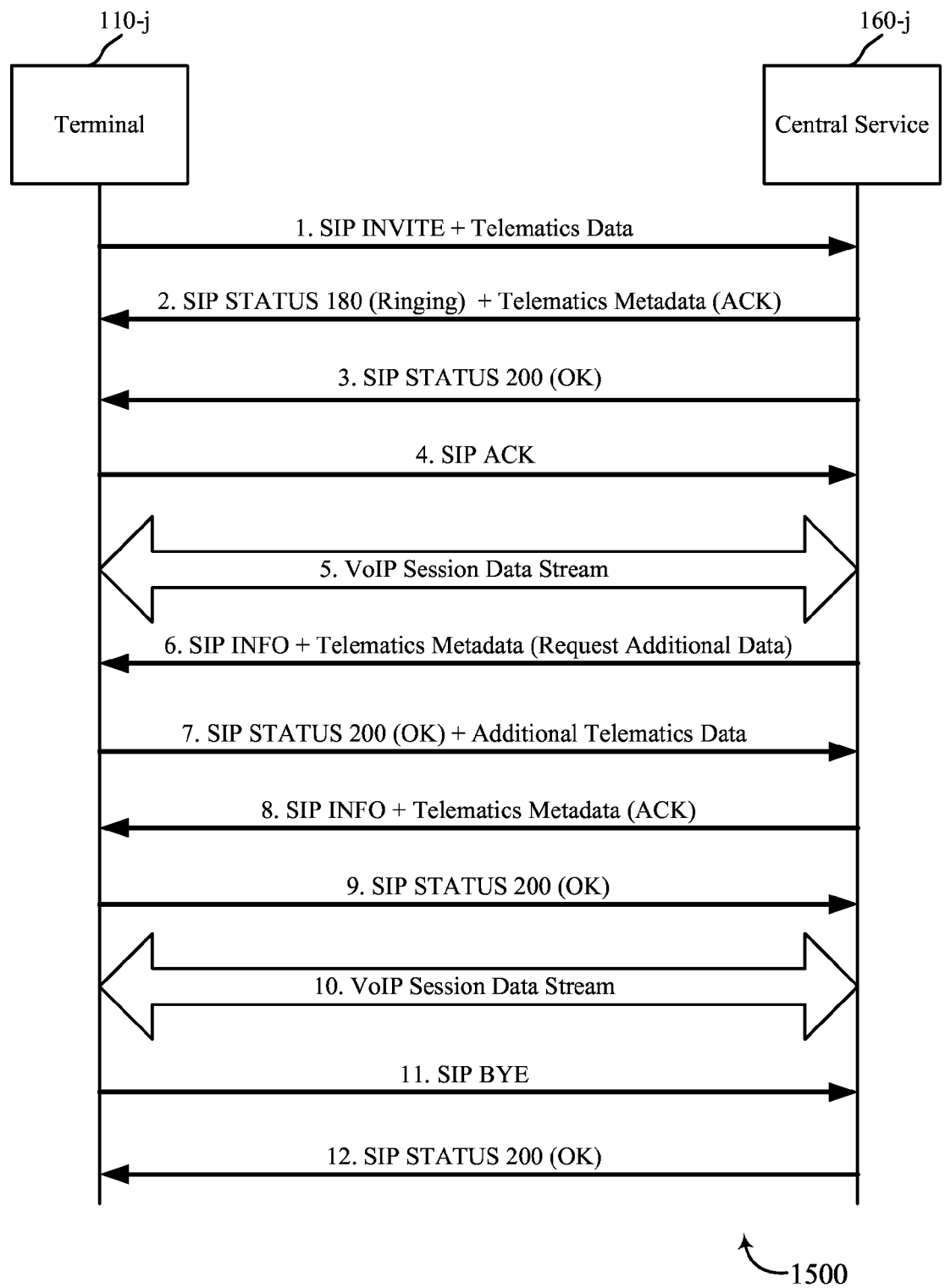
FIG. 15 shows a diagram of an exemplary communications exchange between a terminal and a server.

FIG. 15 is a diagram of another example of a communications exchange 1500 between a terminal 110-*j* and a central service 160-*j* using a communication session signaling protocol to both a) set up a VoIP call and b) exchange telematics data and telematics metadata. Similar to previous examples, the communication session signaling protocol may be a version of SIP modified to carry telematics data and telematics metadata. In other examples, other communication session signaling protocols may be used.

Terminal 110-*j* may be an example of the terminal 110 of FIG. 1A or one of the other terminals 110 described above with reference to previous Figures. Central service 160-*j* may be an example of the central service 160 of FIG. 1A or one of the other central services 160 described above with reference to previous Figures. In certain examples, central service 160-*j* may be implemented by one or more servers. Additionally, in certain examples, one or more proxy servers may be disposed between terminal 110-*j* and central service 160-*j* to forward the communication session signaling protocol messages between terminal 110-*j* and central service 160-*j*.

At a first stage, terminal 110-*j* may transmit a SIP INVITE message to central service 160-*j*. The SIP INVITE message may simultaneously invite central service 160-*j* to a proposed VoIP session with a proposed set of parameters and convey a set of telematics data from terminal 110-*j* to central service 160-*j*. At a second stage, central service 160-*j* may transmit a SIP STATUS 180 (Ringing) response message to terminal 110-*j*. The SIP STATUS 180 (Ringing) response message may also include telematics metadata acknowledging that the telematics data has been received at central service 160-*j*. At a third stage, central service 160-*j* may transmit a SIP STATUS 200 (OK) message to terminal 110-*j* to indicate acceptance of the proposed VoIP session. At a fourth stage, terminal 110-*j* may transmit a SIP ACK message to central service 160-*j*, and at a fifth stage, the VoIP call may be implemented by the negotiated VoIP session.

At a sixth stage, central service 160-*j* may transmit a SIP INFO message to terminal 110-*j* with additional telematics metadata. The additional telematics metadata may request additional telematics data beyond what was included in the initial SIP INVITE message. At a seventh stage, terminal 110-*j* may transmit a SIP STATUS 200 (OK) message to central service 160-*j* with the requested additional telematics data. At an eight stage, central service 160-*j* may transmit a SIP INFO message to terminal 110-*j* with a set of telematics metadata acknowledging receipt of the additional telematics data. At a ninth stage, terminal 110-*j* may transmit a SIP STATUS 200 (OK) message to central service 160-*j* as a response to the SIP INFO message in keeping with SIP protocol. At a tenth stage, the negotiated VoIP session may continue.

In certain examples, stages six through nine may take place without interrupting the VoIP session data stream. Thus, data carrying voice and/or other media may be exchanged between terminal 110-*j* and central service 160-*j* at substantially the same time as the SIP messages carrying telematics data and telematics metadata are exchanged. In certain examples, the SIP INFO and SIP STATUS 200 (OK) messages transmitted between central service 160-*j* and terminal 110-*j* in stages six through nine may not carry useful data about the VoIP session, but rather may be generated and/or transmitted for the sole purpose of carrying telematics data and telematics metadata. Alternatively, the SIP INFO and SIP STATUS 200 (OK) messages in stages six through nine may carry important session information or renegotiated session parameters between terminal 110-*j* and central service 160-*j*.

At an eleventh stage and the conclusion of the VoIP call, terminal 110-*j* may transmit a SIP BYE message to central service 160-*j*. At a twelfth stage, central service 160-*j* may respond with a SIP STATUS 200 (OK) message to confirm that the VoIP session has ended.

Figure 16:
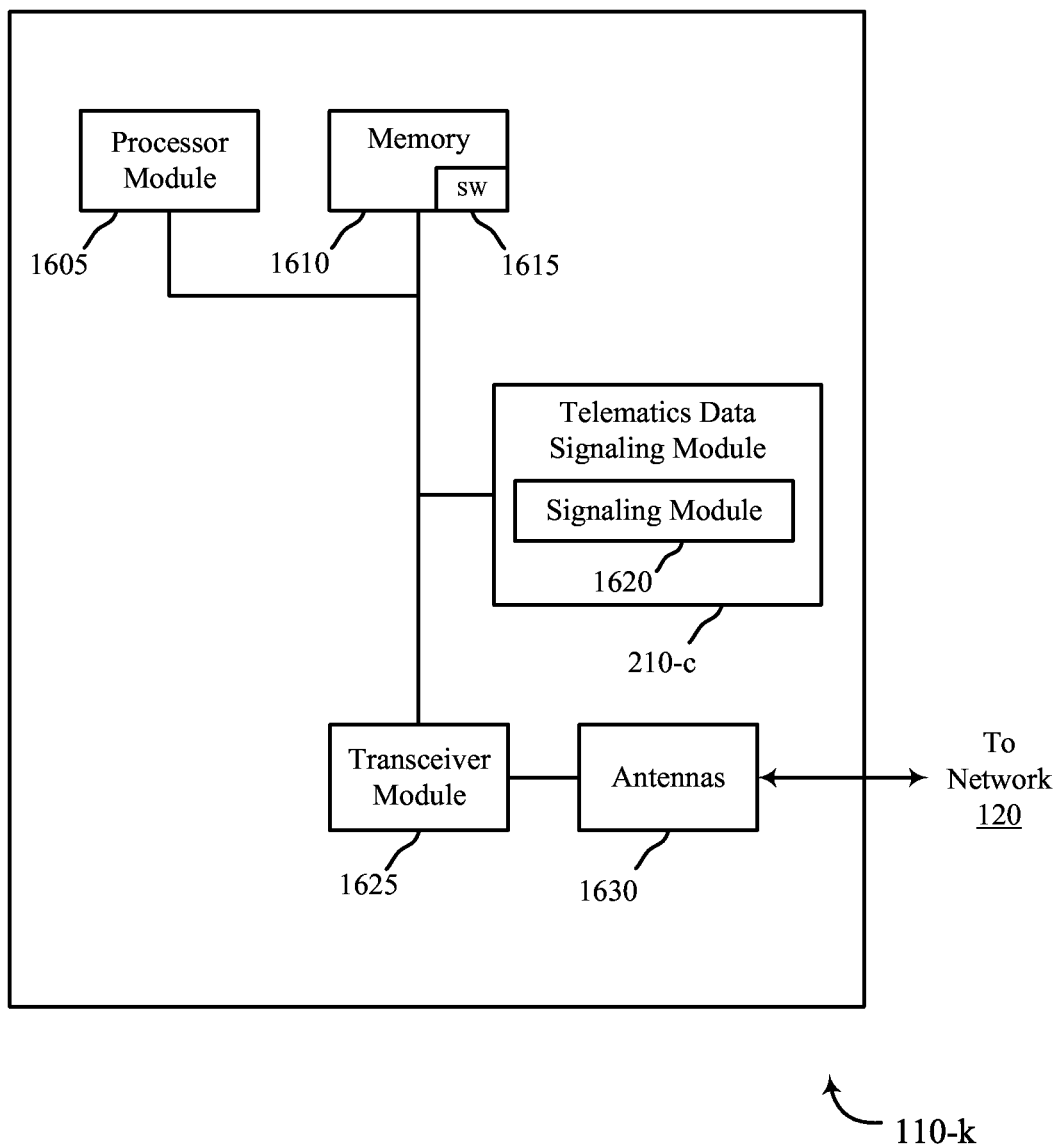
FIG. 16 shows a block diagram of an exemplary terminal in a wireless communications system.

FIG. 16 shows a block diagram of an exemplary wireless terminal 110-*k*. Terminal 110-*k* may be an example of the terminal 110 of FIG. 1A or one of the other terminals 110 described above with reference to previous Figures. The wireless terminal 110-*k* of the present example may include a processor module 1605, a memory 1610, a telematics data signaling module 210-*c*, a transceiver module 1625, and antennas 1630. Each of these components may be communicatively coupled with each other, directly or indirectly (e.g., via one or more buses).

The transceiver module 1625 is configured to communicate bi-directionally, via the antennas 1630 and/or one or more wired or wireless links, with one or more networks, as described above. The transceiver module 1625 may include a modem configured to modulate data and provide the modulated data to the antennas 1630 for transmission, and to demodulate data received from the antennas 1630. While the terminal 110-*k* may include a single antenna, the terminal 110-*k* may include multiple antennas 1630 for multiple links.

The memory 1610 may include random access memory (RAM) and read-only memory (ROM). The memory 1610 may store computer-readable, computer-executable software code 1615 containing instructions that are configured to, when executed, cause the processor module 1605 to perform various functions. Alternatively, the software code 1615 may not be directly executable by the processor module 1605 but be configured to cause the terminal 110-*k* (e.g., when compiled and executed) to perform functions described herein.

The processor module 1605 may include an intelligent hardware device, e.g., a central processing unit (CPU) such as those made by Intel® Corporation, AMD®, or Qualcomm®, a microcontroller, an application-specific integrated circuit (ASIC), etc. According to the architecture of FIG. 16, the terminal 110-*k* may further include the telematics data signaling module 210-*c*. The module 210-*c* may be an example of the telematics data signaling module 210 illustrated in FIGS. 2, 3, and/or 4. The telematics data signaling module 210-*c* may include a signaling module 1620. The signaling module 1620 may cause the transceiver module 1625 to transmit the generated signaling messages to the central service. Additionally, the signaling module 1620 may cause the transceiver module 1625 to receive modified SIP or other communication session signaling protocol messages from the central service.

Figure 17:
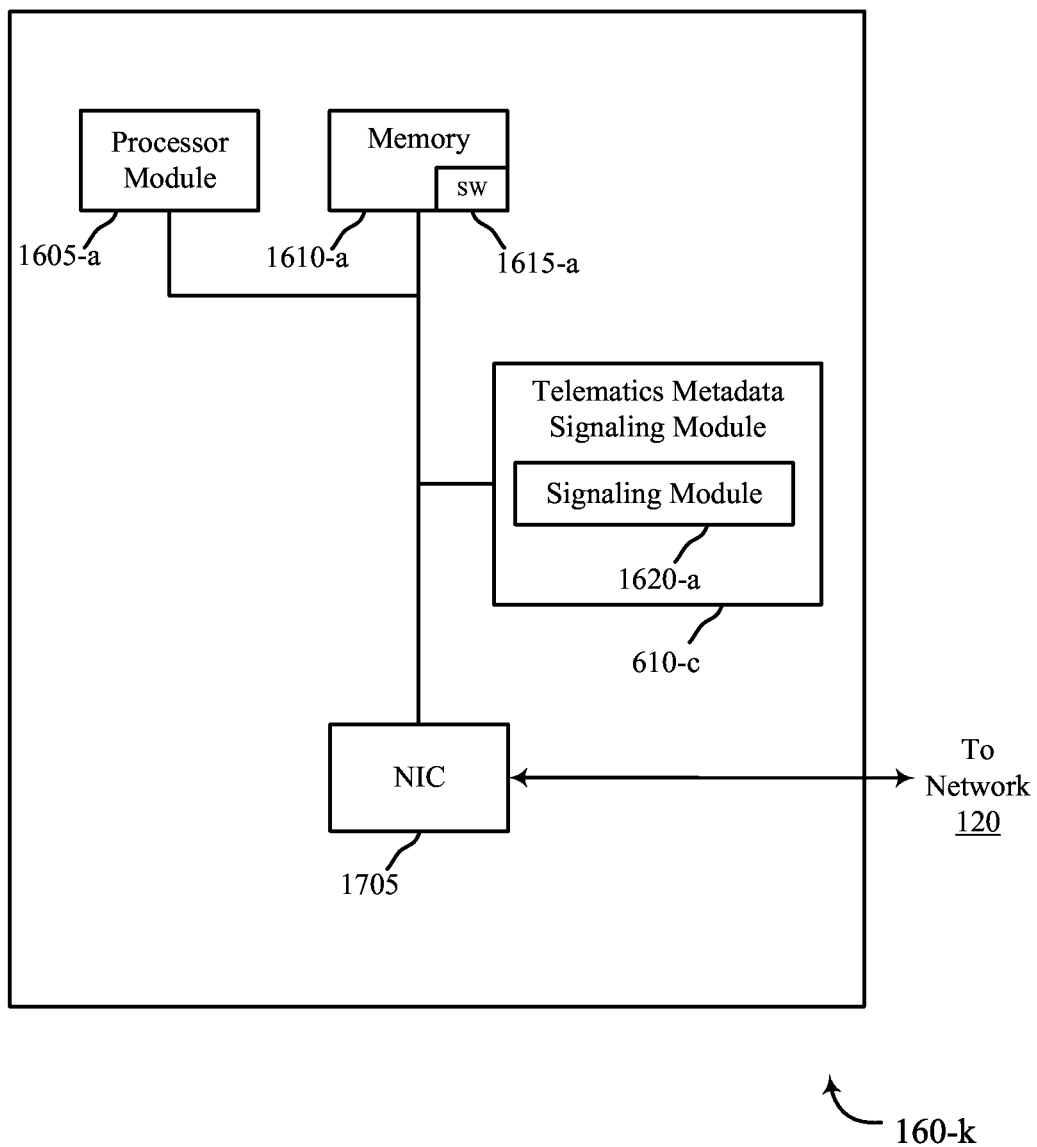
FIG. 17 shows a block diagram of an exemplary central service in a wireless communications system.

FIG. 17 shows a block diagram of an exemplary device implementing a central service 160-*k*. The device implementing the central service 160-*k* may be a server or other computer-based device. Central service 160-*k* may be an example of the central service 160 of FIG. 1A or one or more other central services 160 described above with reference to previous Figures. The central service 160-*k* of the present example may include a processor module 1605-*a*, a memory 1610-*a*, a telematics metadata signaling module 610-*c*, and a network interface controller (NIC) 1705. Each of these components may be communicatively coupled with each other, directly or indirectly.

The memory 1610-*a* may include random access memory (RAM) and read-only memory (ROM). The memory 1610-*a* may store computer-readable, computer-executable software code 1615-*a* containing instructions that are configured to, when executed, cause the processor module 1605-*a* to perform various functions. Alternatively, the software code 1615-*a* may not be directly executable by the processor module 1605-*a* but be configured to cause the central service 160-*k* (e.g., when compiled and executed) to perform functions described herein.

The central service 160-*k* may include the telematics metadata signaling module 610-*c*. The module 610-*c* may be an example of the telematics metadata signaling module 610 illustrated in FIGS. 6, 7, and/or 8. The telematics metadata signaling module 610-*c* may include a signaling module 1620-*a*. The signaling module 1620-*a* may cause the NIC 1705 to transmit the generated signaling messages to the terminal 110. Additionally, the signaling module 1620-*a* may cause the network interface card 1705 to receive modified SIP or other communication session signaling protocol messages from the terminal.

Figure 18:
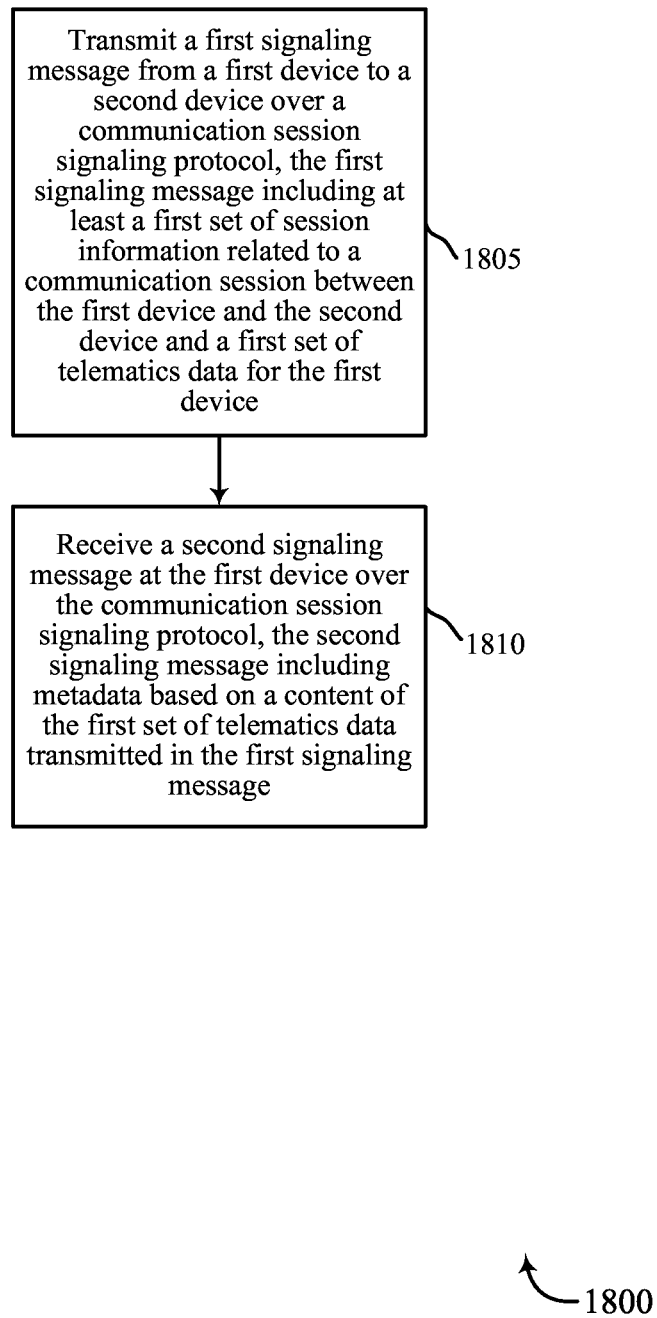
FIG. 18 is a flowchart of an exemplary method of communicating telematics data.

FIG. 18 is a flowchart illustrating one embodiment of a method 1800 for communicating telematics data and/or telematics metadata. For clarity, the method 1800 is described with reference to the terminal 110 of FIGS. 1A, 1B, 2, 3, 4, 10, 11, 12, 13, 14, 15, and/or 16. In one implementation, the telematics data signaling module 210 of FIGS. 2, 3, 4, and/or 16 may execute one or more sets of codes to control the functional elements of the terminal 110 to perform the functions described below.

At block 1805, a first signaling message may be transmitted from a first device to a second device over a communication session signaling protocol. In one example, the first signaling message may include at least a first set of session information related to a communication session between the first device and the second device and a first set of telematics data for the first device. In certain examples, the first device may be one or more of the terminals 110 described with reference to the preceding Figures, and the second device may be one or more of the central services 160 described with reference to the preceding Figures. The communication session signaling protocol may be, for example a modified version of Session Initiation Protocol (SIP) as described in the previous examples, or another applicable communication session signaling protocol (e.g., XMPP, Google Talk, Skype, etc.). The communication session may be a VoIP call between the terminal and the central service. In some cases, the communication session may exchange streaming media (such as voice, video, streaming or character-at-a-time text) inside a media stream as well as any media (such as text messages) outside of a media stream. In one example, the communication session may only carry non-streaming media.

At block 1810, a second signaling message may be received at the first device over the communication session signaling protocol. In one example, the second signaling message may include metadata based on a content of the first set of telematics data transmitted in the first signaling message. The telematics metadata may include, but is not limited to, an acknowledgement of whether the telematics data was received at the central service 160, a request to retransmit the telematics data, a request to transmit different telematics data, a request to take some other action, auxiliary data describing actions taken by the central service, and/or other relevant telematics metadata.

Therefore, the method 1800 may provide for communicating telematics data and/or telematics metadata. It should be noted that the method 1800 is just one implementation and that the operations of the method 1800 may be rearranged or otherwise modified such that other implementations are possible.

Figure 19:
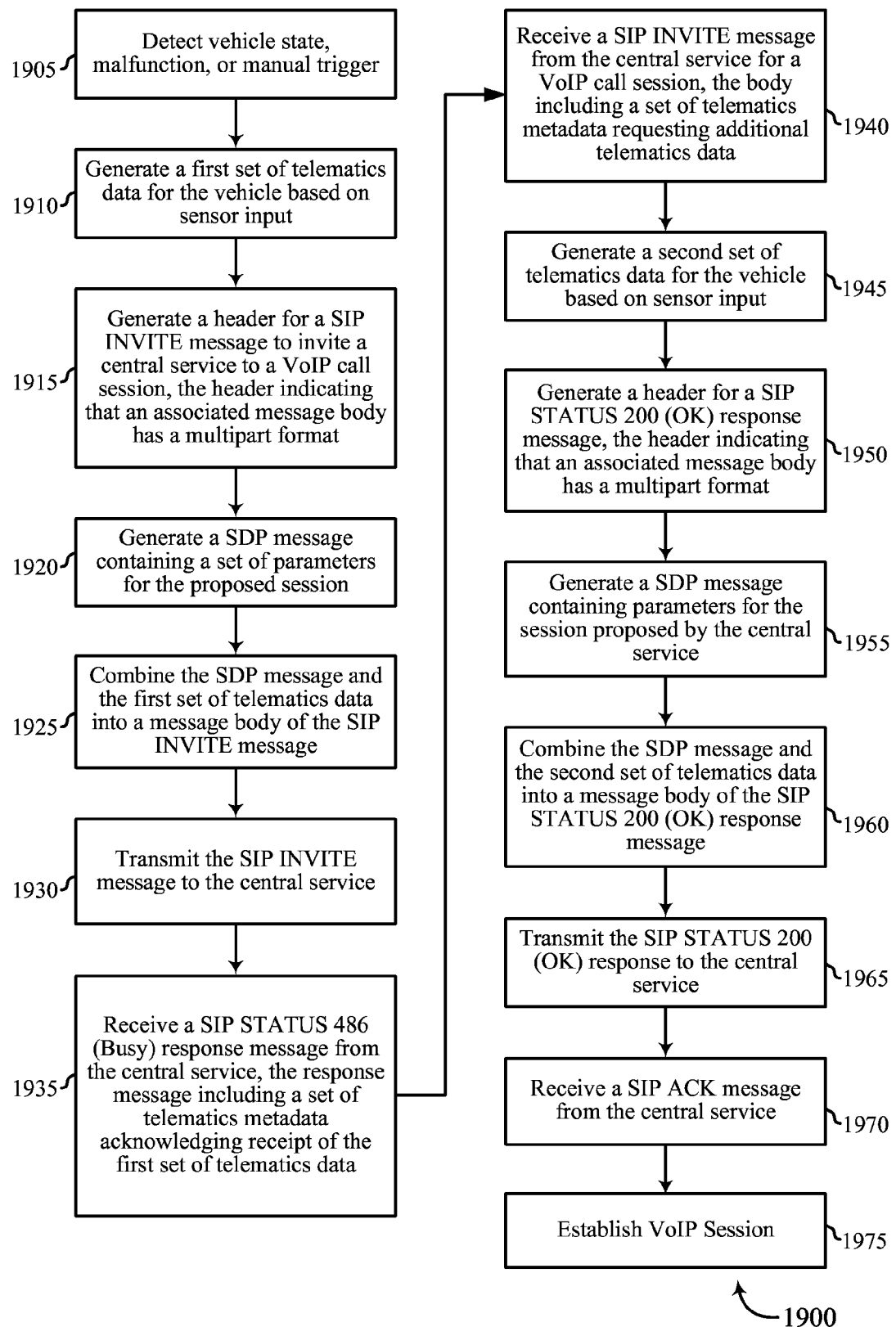
FIG. 19 is a flowchart of an exemplary method of communicating telematics data.

FIG. 19 is a flowchart illustrating one embodiment of a method 1900 for communicating telematics data and/or telematics metadata by modifying signaling messages used in a communication session signaling protocol. For clarity, the method 1900 is described with reference to the terminal 110 of FIGS. 1A, 1B, 2, 3, 4, 10, 11, 12, 13, 14, 15, and/or 16. In one implementation, the telematics data signaling module 210 of FIGS. 2, 3, 4, and/or 16 may execute one or more sets of codes to control the functional elements of the terminal 110 to perform the functions described below. The method 1900 of FIG. 19 may be an example of the method 1800 of FIG. 18.

At block 1905, a vehicle state (e.g., crash, fire, airbag deployment, rollover, or other situation), malfunction, or manual trigger may be detected at the terminal. At block 1910, a first set of telematics data for the vehicle may be generated based on input from one or more sensors communicatively coupled with the terminal. At block 1915, a header for a SIP INVITE message may be generated at the terminal to invite a central service (e.g., PSAP) to a Voice over Internet Protocol (VoIP) call session, the header indicating that an associated message body has a multipart format. At block 1920, a session description protocol (SDP) message containing a set of parameters for the proposed session may be generated at the terminal. At block 1925, the SDP message and the first set of telematics data may be combined into a message body of the SIP INVITE message, with the SDP message as a first portion of the body of the SIP INVITE message and the telematics data as a second portion of the body of the SIP INVITE message. At block 1930, the SIP INVITE message may be transmitted to the central service. In one example, the terminal may send the INVITE to an entity which has responsibility for handling emergency requests (such as an entity within a carrier's network), and that entity may process or forward the INVITE to or towards the central service (e.g., PSAP).

At block 1935, a SIP STATUS 486 (Busy) response message may be received from the PSAP central service device. In one example, the response message may include a multi-part body containing a first portion of the message body and a set of telematics metadata acknowledging receipt of the first set of telematics data in a second portion of the message body. It is noted that the SIP STATUS 486 (Busy) response message may not include SDP information in the message body (the first portion of the message body may be empty, for example). In certain examples, the terminal may determine from a header of the second signaling message that the body of the SIP STATUS 486 (Busy) response message is in the multi-part format. The terminal may further identify the first portion of the message body and the second portion of the message body based on information in the header of the SIP STATUS 486 (Busy) response message. In some cases, other STATUS responses may be used.

At block 1940, a SIP INVITE message may be received at the terminal from the PSAP central service device for a VoIP call session, and the body of the SIP INVITE message may include a set of telematics metadata requesting additional telematics data from the terminal. Alternatively, the telematics metadata may be received at the terminal in a separate signaling message. At block 1945, a second set of telematics data may be generated for the vehicle based on input from the sensors and/or other sources of telematics data. At block 1950, a header for a SIP STATUS 200 (OK) response message may be generated at the terminal. In one example, the header may indicate that an associated message body has a multi-part format. At block 1955, a SDP message containing parameters for the session proposed by the PSAP central service device may be generated. At block 1960, the SDP message and the second set of telematics data may be combined into a message body of the SIP STATUS 200 (OK) message. At block 1965, the SIP STATUS 200 (OK) response message may be transmitted to the central service from the terminal. At block 1970, a SIP ACK message may be received at the terminal from the central service, and at block 1975, a VoIP session may be established between the terminal and the central service.

Thus, the method 1900 may provide for the communication of telematics data and/or telematics metadata. It should be noted that the method 1900 is just one implementation and that the operations of the method 1900 may be rearranged or otherwise modified such that other implementations are possible.

Figure 20:
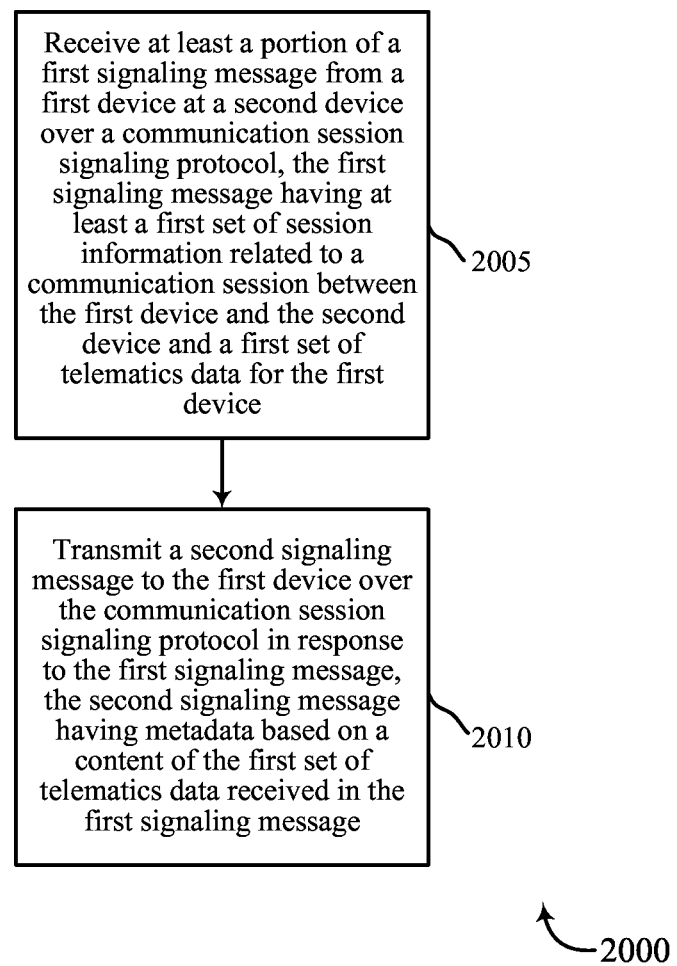
FIG. 20 is a flowchart of an exemplary method of communicating telematics data.

FIG. 20 is a flowchart illustrating one embodiment of a method 2000 for communicating telematics data and/or telematics metadata. For clarity, the method 2000 is described with reference to the central service 160 of FIGS. 1A, 1B, 6, 7, 8, 10, 11, 12, 13, 14, 15, and/or 17. In one implementation, the telematics metadata signaling module 610 of FIGS. 6, 7, 8, and/or 17 may execute one or more sets of codes to control the functional elements of the central service 160 to perform the functions described below.

At block 2005, at least a portion of a first signaling message may be received from a first device at a second device over a communication session signaling protocol. In one embodiment, the first signaling message may have at least a first set of session information related to a communication session between the first device and the second device. The first signaling message may also have at least a first set of telematics data for the first device. In certain examples, the first device may be one or more of the terminals 110 described with reference to the preceding Figures, and the second device may be one or more of the central services 160 described with reference to the preceding Figures. The communication session signaling protocol may be, for example a modified version of Session Initiation Protocol (SIP) as described in the previous examples, or another applicable communication session signaling protocol (e.g., XMPP, Google Talk, Skype, etc.). The communication session may be a VoIP call between the terminal and the central service. In some cases, the communication session may exchange streaming media (such as voice, video, streaming or character-at-a-time text) inside a media stream as well as any media (such as text messages) outside of a media stream. In one example, the communication session may only carry non-streaming media At block 2010, a second signaling message may be transmitted to the first device over the communication session signaling protocol in response to the first signaling message, the second signaling message having metadata based on a content of the first set of telematics data received in the first signaling message.

Therefore, the method 2000 may provide for communicating telematics data and/or telematics metadata by modifying signaling messages used in a communication session signaling protocol. It should be noted that the method 2000 is just one implementation and that the operations of the method 2000 may be rearranged or otherwise modified such that other implementations are possible.

Figure 21:
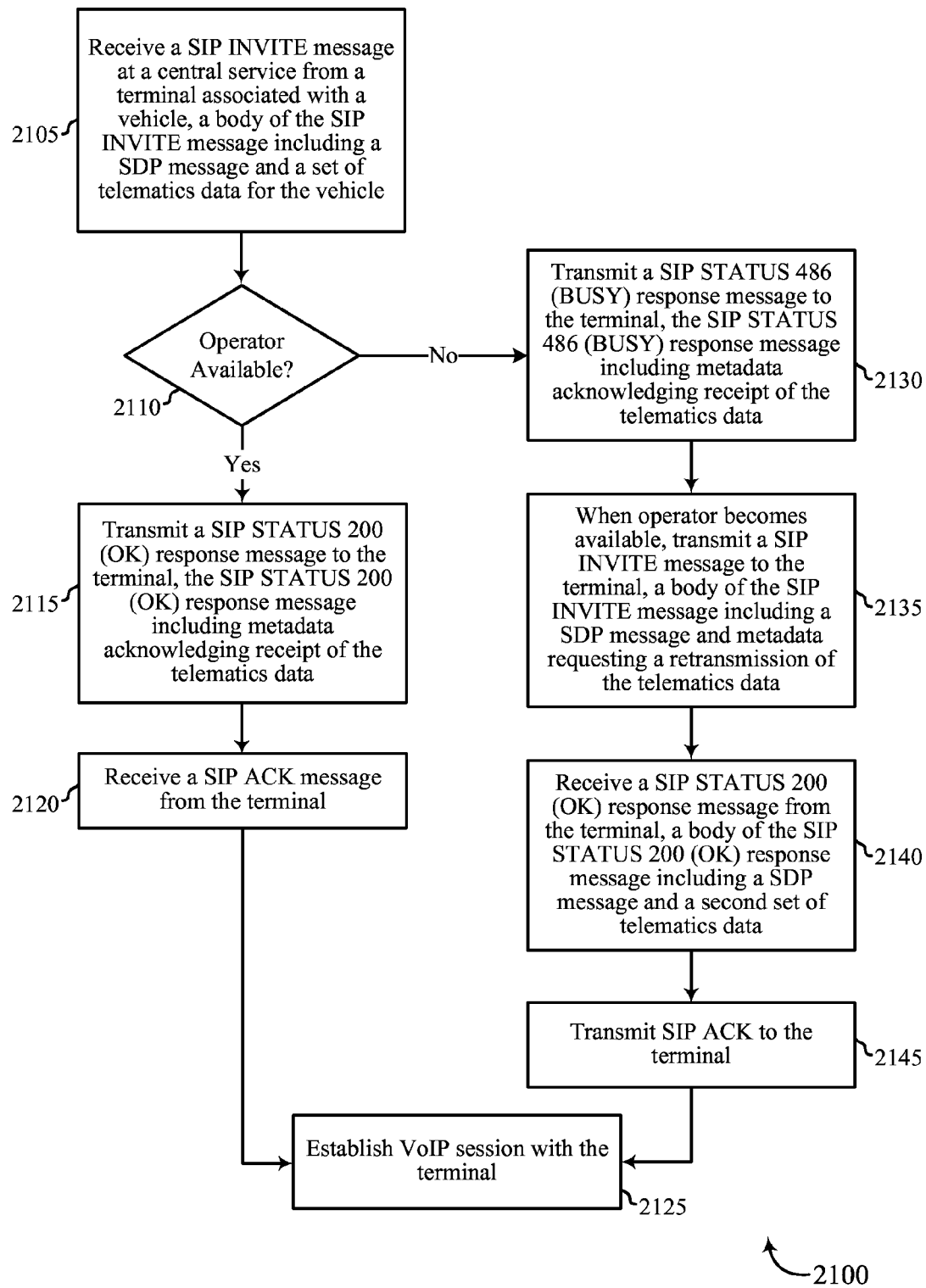
FIG. 21 is a flowchart of an exemplary method of communicating telematics data.

FIG. 21 is a flowchart illustrating one embodiment of a method 2100 for communicating telematics data and/or telematics metadata by modifying signaling messages used in a communication session signaling protocol. For clarity, the method 2100 is described with reference to the central service 160 of FIGS. 1A, 1B, 6, 7, 8, 10, 11, 12, 13, 14, 15, and/or 17. In one implementation, the telematics metadata signaling module 610 of FIGS. 6, 7, 8, and/or 17 may execute one or more sets of codes to control the functional elements of the central service 160 to perform the functions described below. The method 2100 of FIG. 21 may be an example of the method 2000 of FIG. 20.

At block 2105, a SIP INVITE message may be received at a central service (e.g., PSAP) from a terminal associated with a vehicle. A body of the SIP INVITE message may include an SDP message and a set of telematics data for the vehicle. At block 2110, a determination is made as to whether an operator is available to accept a voice and/or other media call at the central service. If an operator is available (block 2110, YES), the central service may transmit a SIP STATUS 200 (OK) response message to the terminal, at block 2115 the SIP STATUS 200 (OK) response message including metadata acknowledging receipt of the telematics data. Alternatively, the metadata may be transmitted to the terminal in a separate signaling message. At block 2120, a SIP ACK message may be received from the terminal, and at block 2125, a VoIP session or other communication may be established with the terminal.

If, however, no operator is available to accept the call (block 2110, NO), at block 2130 the PSAP central service device may transmit a SIP STATUS 485 (BUSY) response message to the terminal, the response message including metadata acknowledging receipt of the telematics data. At block 2135, when an operator becomes available, the central service may transmit a SIP INVITE message to the terminal, where a body of the SIP message contains a SDP message and metadata requesting a retransmission of the telematics data. At block 2140, the central service may receive a SIP STATUS 200 (OK) response message from the terminal, where a body of the SIP STATUS 200 (OK) response message contains a SDP message and a second set of telematics data. At block 2145, a SIP ACK message may be transmitted to the terminal, and at block 2125, a VoIP session or other communication may be established with the terminal.

Thus, the method 2100 may provide for the communication of telematics metadata. It should be noted that the method 2100 is just one implementation and that the operations of the method 2100 may be rearranged or otherwise modified such that other implementations are possible.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-Ray disc where disks usually reproduce data magnetically, while discs reproduce data optically with lasers. Combinations of the above are also included within the scope of computer-readable media.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method of communicating telematics data, comprising:
    transmitting a first Session Initiation Protocol (SIP) message from a first device to a second device, the first SIP message comprising at least a first set of session information related to a communication session between the first device and the second device and a first set of telematics data related to a status of the first device; and
    receiving a second SIP message at the first device, the second SIP message comprising metadata based on a content of the first set of telematics data transmitted in the first SIP message.

2. The method of claim 1, wherein the first set of session information comprises at least one of a request to initiate the communication session or information associated with the communication session.

3. The method of claim 1, wherein the second SIP message includes a second set of session information related to the communication session.

4. The method of claim 1, wherein the receiving the second SIP message comprises:
    receiving an indication of whether the first set of telematics data was satisfactorily received at the second device, the indication comprising the metadata based on the content of the first set of telematics data.

5. The method of claim 1, wherein the receiving the second SIP message further comprises:
    receiving a request with respect to the first set of telematics data, the request comprising the metadata based on the content of the first set of telematics data.

6. The method of claim 5, the request comprising at least one of: a request to retransmit the first set of telematics data, a request to transmit an updated version of the first set of telematics data, or a request to transmit a different set of telematics data.

7. The method of claim 5, further comprising:
    transmitting a third SIP message from the first device to the second device, the third SIP message comprising at least a response to the request received with respect to the first set of telematics data.

8. The method of claim 1, wherein the receiving the second SIP message further comprises:
    receiving an instruction from the second device to take at least one action based on the content of the first set of telematics data, the instruction comprising the metadata based on the content of the first set of telematics data.

9. The method of claim 8, wherein the at least one action comprises at least one of: gathering additional telematics data, performing an action that affects a state of a vehicle, activating a component of a vehicle, deactivating a component of a vehicle, turning an ignition of a vehicle off, turning an ignition of a vehicle on, turning a fuel supply of a vehicle off, turning a fuel supply of a vehicle on, unlocking a door, locking a door, activating a horn of a vehicle, activating an externally audible sound, activating lights of a vehicle, activating flashers of a vehicle, actuating a power window, playing a recorded message, rendering media, or displaying a text message.

10. The method of claim 3, further comprising:
    determining from a header of the second SIP message that at least a portion of a body of the second SIP message comprises the metadata.

11. The method of claim 10, further comprising:
    determining from the header of the second SIP message that the body of the second SIP message comprises a multipart format;
    identifying a first portion of the body of the second SIP message based on information in the header; the first portion of the body of the second SIP message comprising at least the second set of session information related to the communication session; and
    identifying a second portion of the body of the second SIP message based on the information in the header; the second portion of the body of the second SIP message comprising at least the metadata based on the content of the first set of telematics data transmitted in the first SIP message.

12. The method of claim 1, further comprising:
    generating a header for the first SIP message, the header comprising an indication that at least a portion of a body of the first SIP message comprises the first set of telematics data.

13. The method of claim 12, further comprising:
    formatting the first set of session information according to a first protocol;
    formatting the first set of telematics data according to a second protocol; and
    combining at least the formatted first set of session information and the formatted first set of telematics data to generate the body of the first SIP message.

14. The method of claim 1, wherein the first SIP message comprises an invitation to initiate the communication session and the second SIP message comprises a rejection of the invitation.

15. The method of claim 1, wherein the communication session comprises a Voice over Internet Protocol (VoIP) call.

16. The method of claim 1, wherein the communication session carries one or more of voice, character-at-a-time text, message-at-a-time text, video, and text messaging using at least one of streaming or non-streaming media.

17. A device for communicating telematics data, comprising:
    a processor; and
    a memory in electronic communication with the processor, the memory embodying instructions, the instructions being executable by the processor to:
    transmit a first Session Initiation Protocol (SIP) message from a first device to a second device, the first SIP message comprising at least a first set of session information related to a communication session between the first device and the second device and a first set of telematics data related to a status of the first device; and
    receive a second SIP message at the first device, the second SIP message comprising metadata based on a content of the first set of telematics data transmitted in the first SIP message.

18. The device of claim 17, wherein the first set of session information comprises at least one of a request to initiate the communication session or information associated with the communication session.

19. The device of claim 17, wherein the second SIP message includes a second set of session information related to the communication session.

20. The device of claim 17, wherein the instructions are executable by the processor to:
    receive an indication of whether the first set of telematics data was satisfactorily received at the second device, the indication comprising the metadata based on the content of the first set of telematics data.

21. The device of claim 17, wherein the instructions are executable by the processor to:
receive a request with respect to the first set of telematics data, the request comprising the metadata based on the content of the first set of telematics data.

22. The device of claim 17, wherein the instructions are executable by the processor to:
receive an instruction from the second device to take at least one action based on the content of the first set of telematics data, the instruction comprising the metadata based on the content of the first set of telematics data.

23. The device of claim 19, wherein the instructions are executable by the processor to:
determine from a header of the second SIP message that at least a portion of a body of the second SIP message comprises the metadata.

24. The device of claim 23, wherein the instructions are executable by the processor to:
determine from the header of the second SIP message that the body of the second SIP message comprises a multipart format;
identify a first portion of the body of the second SIP message based on information in the header; the first portion of the body of the second SIP message comprising at least the second set of session information related to the communication session; and
identify a second portion of the body of the second SIP message based on the information in the header; the second portion of the body of the second SIP message comprising at least the metadata based on the content of the first set of telematics data transmitted in the first SIP message.

25. An apparatus for communicating telematics data, comprising:
means for transmitting a first Session Initiation Protocol (SIP) message from a first device to a second device, the first SIP message comprising at least a first set of session information related to a communication session between the first device and the second device and a first set of telematics data related to a status of the first device; and
means for receiving a second SIP message at the first device, the second SIP message comprising metadata based on a content of the first set of telematics data transmitted in the first SIP message.

26. The apparatus of claim 25, wherein the first set of session information comprises at least one of a request to initiate the communication session or information associated with the communication session.

27. The apparatus of claim 25, wherein the second SIP message includes a second set of session information related to the communication session.

28. The apparatus of claim 25, wherein the means for receiving the second SIP message comprises:
means for receiving an indication of whether the first set of telematics data was satisfactorily received at the second device, the indication comprising the metadata based on the content of the first set of telematics data.

29. The apparatus of claim 25, wherein the means for receiving the second SIP message comprises:
means for receiving a request with respect to the first set of telematics data, the request comprising the metadata based on the content of the first set of telematics data.

30. The apparatus of claim 29, the request comprising at least one of: a request to retransmit the first set of telematics data, a request to transmit an updated version of the first set of telematics data, or a request to transmit a different set of telematics data.

31. The apparatus of claim 29, further comprising:
means for transmitting a third SIP message from the first device to the second device, the third SIP message comprising at least a response to the request received with respect to the first set of telematics data.

32. A computer program product for communicating telematics data, the computer program product comprising a non-transitory computer-readable medium storing instructions executable by a processor to:
transmit a first Session Initiation Protocol (SIP) message from a first device to a second device, the first SIP message comprising at least a first set of session information related to a communication session between the first device and the second device and a first set of telematics data related to a status of the first device; and
receive a second SIP message at the first device, the second SIP message comprising metadata based on a content of the first set of telematics data transmitted in the first SIP message.

33. The computer program product of claim 32, wherein the first set of session information comprises at least one of a request to initiate the communication session or information associated with the communication session.

34. The computer program product of claim 32, wherein the second SIP message includes a second set of session information related to the communication session.

35. A method of communicating telematics data, comprising:
receiving at least a portion of a first Session Initiation Protocol (SIP) message from a first device at a second device, the first SIP message comprising at least a first set of session information related to a communication session between the first device and the second device and a first set of telematics data related to a status of the first device; and
transmitting a second SIP message to the first device in response to the first SIP message, the second SIP message comprising metadata based on a content of the first set of telematics data received in the first SIP message.

36. The method of claim 35, wherein the first set of session information comprises at least one of a request to initiate the communication session or information associated with the communication session.

37. The method of claim 35, wherein the second SIP message includes a second set of session information related to the communication session.

38. The method of claim 35, wherein the transmitting the second SIP message comprises:
transmitting an indication of whether the first set of telematics data was satisfactorily received at the second device, the indication comprising the metadata based on the content of the first set of telematics data.

39. The method of claim 35, wherein the transmitting the second SIP message comprises:
transmitting a request with respect to the first set of telematics data, the request comprising the metadata based on the content of the first set of telematics data.

40. The method of claim 39, the request comprising at least one of: a request to retransmit the first set of telematics data, a request to transmit an updated version of the first set of telematics data, or a request to transmit a different set of telematics data.

41. The method of claim 39, further comprising:
receiving a third SIP message from the first device, the third SIP message comprising at least a response to the request transmitted with respect to the first set of telematics data.

42. The method of claim 35, wherein the transmitting the second SIP message comprises:
identifying at least one action associated with the first set of telematics data; and
transmitting an instruction to the first device to take the at least one identified action based on the content of the first set of telematics data, the instruction comprising the metadata based on the content of the first set of telematics data.

43. The method of claim 42, wherein the at least one identified action comprises at least one of: gathering additional telematics data, performing an action that affects a state of a vehicle, activating a component of a vehicle, deactivating a component of a vehicle, turning an ignition of a vehicle off, turning an ignition of a vehicle on, turning a fuel supply of a vehicle off, turning a fuel supply of a vehicle on, unlocking a door, locking a door, activating a horn of a vehicle, activating an externally audible sound, activating lights of a vehicle, activating flashers of a vehicle, actuating a power window, playing a recorded message, rendering media, or displaying a text message.

44. The method of claim 35, further comprising:
determining from a header of the first SIP message that at least a portion of a body of the first SIP message comprises the first set of telematics data.

45. The method of claim 44, further comprising
determining from the header of the first SIP message that the body of the first SIP message comprises a multipart format;
identifying a first portion of the body of the first SIP message based on information in the header; the first portion of the body of the first SIP message comprising at least the first set of session information related to the communication session; and
identifying a second portion of the body of the first SIP message based on the information in the header; the second portion of the body of the first SIP message comprising at least the first set of telematics data.

46. The method of claim 37, further comprising:
generating a header for the second SIP message, the header comprising an indication that at least a portion of a body of the second SIP message comprises the metadata.

47. The method of claim 46, further comprising:
formatting the second set of session information related to the communication session according to a first protocol;
formatting the metadata based on the content of the first set of telematics data according to a second protocol; and
combining at least the formatted second set of session information and the formatted metadata based on the content of the first set of telematics data to generate the body of the second SIP message.

48. The method of claim 35, wherein the first SIP message comprises an invitation to initiate the communication session and the second SIP message comprises a rejection of the invitation.

49. The method of claim 35, wherein the communication session comprises a Voice over Internet Protocol (VoIP) call.

50. The method of claim 35, wherein the communication session carries one or more of: voice, character-at-a-time text, message-at-a-time text, video, and text messaging using at least one of streaming or non-streaming media.

51. A device for communicating telematics data, comprising:
a processor; and
a memory in electronic communication with the processor, the memory embodying instructions, the instructions being executable by the processor to:
receive at least a portion of a first Session Initiation Protocol (SIP) message from a first device at a second device, the first SIP message comprising at least a first set of session information related to a communication session between the first device and the second device and a first set of telematics data related to a status of the first device; and
transmit a second SIP message to the first device in response to the first SIP message, the second SIP message comprising metadata based on a content of the first set of telematics data received in the first SIP message.

52. The device of claim 51, wherein the first set of session information comprises at least one of a request to initiate the communication session or information associated with the communication session.

53. The device of claim 51, wherein the second SIP message includes a second set of session information related to the communication session.

54. The device of claim 51, wherein the instructions are executable by the processor to:
transmit an indication of whether the first set of telematics data was satisfactorily received at the second device, the indication comprising the metadata based on the content of the first set of telematics data.

55. The device of claim 51, wherein the instructions are executable by the processor to:
transmit a request with respect to the first set of telematics data, the request comprising the metadata based on the content of the first set of telematics data.

56. The device of claim 51, wherein the instructions are executable by the processor to:
identify at least one action associated with the first set of telematics data; and
transmit an instruction to the first device to take the at least one identified action based on the content of the first set of telematics data, the instruction comprising the metadata based on the content of the first set of telematics data.

57. The device of claim 51, wherein the instructions are executable by the processor to:
determine from a header of the first SIP message that at least a portion of a body of the first SIP message comprises the telematics data.

58. The device of claim 57, wherein the instructions are executable by the processor to:
determine from the header of the first SIP message that the body of the first SIP message comprises a multipart format;
identify a first portion of the body of the first SIP message based on information in the header; the first portion of the body of the first SIP message comprising at least the first set of session information related to the communication session; and
identify a second portion of the body of the first SIP message based on the information in the header; the second portion of the body of the first SIP message comprising at least the first set of telematics data.

59. An apparatus for communicating telematics data, comprising:
- means for receiving at least a portion of a first Session Initiation Protocol (SIP) message from a first device at a second device, the first SIP message comprising at least a first set of session information related to a communication session between the first device and the second device and a first set of telematics data related to a status of the first device; and
- means for transmitting a second SIP message to the first device in response to the first SIP message, the second SIP message comprising metadata based on a content of the first set of telematics data received in the first SIP message.

60. The apparatus of claim 59, wherein the first set of session information comprises at least one of a request to initiate the communication session or information associated with the communication session.

61. The apparatus of claim 59, wherein the second SIP message includes a second set of session information related to the communication session.

62. The apparatus of claim 59, wherein the means for transmitting the second SIP message comprises:
- means for transmitting an indication of whether the first set of telematics data was satisfactorily received at the second device, the indication comprising the metadata based on the content of the first set of telematics data.

63. The apparatus of claim 59, wherein the means for transmitting the second SIP message comprises:
- means for transmitting a request with respect to the first set of telematics data, the request comprising the metadata based on the content of the first set of telematics data.

64. The apparatus of claim 63, the request comprising at least one of: a request to retransmit the first set of telematics data, a request to transmit an updated version of the first set of telematics data, or a request to transmit a different set of telematics data.

65. The apparatus of claim 63, further comprising:
- means for receiving a third SIP message from the first device, the third SIP message comprising at least a response to the request transmitted with respect to the first set of telematics data.

66. A computer program product for communicating telematics data, the computer program product comprising a non-transitory computer-readable medium storing instructions executable by a processor to:
- receive at least a portion of a first Session Initiation Protocol (SIP) message from a first device at a second device, the first SIP message comprising at least a first set of session information related to a communication session between the first device and the second device and a first set of telematics data related to a status of the first device; and
- transmit a second SIP message to the first device in response to the first SIP message, the second SIP message comprising metadata based on a content of the first set of telematics data received in the first SIP message.

67. The computer program product of claim 66, wherein the first set of session information comprises at least one of a request to initiate the communication session or information associated with the communication session.

68. The computer program product of claim 66, wherein the second SIP message includes a second set of session information related to the communication session.

* * * * *